United States Patent
Tredwell et al.

(10) Patent No.: US 9,097,809 B2
(45) Date of Patent: Aug. 4, 2015

(54) RADIOGRAPHIC DETECTOR INCLUDING TRAP OCCUPANCY CHANGE MONITOR AND FEEDBACK, IMAGING APPARATUS AND METHODS USING THE SAME

(75) Inventors: Timothy J. Tredwell, Fairport, NY (US); Mark E. Shafer, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 527 days.

(21) Appl. No.: 13/173,384

(22) Filed: Jun. 30, 2011

(65) Prior Publication Data

US 2013/0001426 A1    Jan. 3, 2013

(51) Int. Cl.
G01T 1/20    (2006.01)
H04N 5/359    (2011.01)
H04N 5/325    (2006.01)
H04N 5/32    (2006.01)

(52) U.S. Cl.
CPC .............. *G01T 1/2018* (2013.01); *H04N 5/325* (2013.01); *H04N 5/3205* (2013.01); *H04N 5/3597* (2013.01)

(58) Field of Classification Search
CPC .... H04N 5/3597; H04N 5/325; H04N 5/3205
USPC ........................................ 250/370.09, 370.14
See application file for complete search history.

(56) References Cited

U.S. PATENT DOCUMENTS

| | | | |
|---|---|---|---|
| 5,804,832 A * | 9/1998 | Crowell et al. | 250/580 |
| 5,920,070 A | 7/1999 | Petrick et al. | |
| 6,028,314 A | 2/2000 | Finkler | |
| 6,404,853 B1 * | 6/2002 | Odogba et al. | 378/98.8 |
| 7,593,508 B2 | 9/2009 | Tsuchiya | |
| 2005/0175254 A1 | 8/2005 | Granfors et al. | |
| 2008/0078940 A1 | 4/2008 | Castleberry et al. | |
| 2008/0240366 A1 * | 10/2008 | Bacher et al. | 378/207 |

FOREIGN PATENT DOCUMENTS

WO    WO2008/048425    4/2008

OTHER PUBLICATIONS

European Search Report mailed Jan. 25, 2013 for EP Application No. 12 004 876.4, 2 pages.
D.A. Roberts et al., "Charge Trapping at High Doses in an Active Matrix Flat Panel Dosimeter," IEEE Transactions on Nuclear Science, vol. 51, No. 4, Aug. 2004, pp. 1427-1433.

* cited by examiner

*Primary Examiner* — David J Makiya
*Assistant Examiner* — Kenneth J Malkowski

(57) ABSTRACT

Embodiments of radiographic imaging systems; digital radiography detectors and methods for using the same can monitor and/or control trap occupancy levels in photosensors of radiographic sensors (e.g., DR FPDs). In exemplary radiographic imaging apparatus embodiments, monitoring of trap occupancy or change in trap occupancy of the photosensor can determine whether an imaging array or detector panel has reached a stable operating point. In another embodiment, trap occupancy information can be used (a) to enable a generator (e.g., x-ray source) for a radiographic exposure and/or (b) to adjust to or to maintain a change in trap occupancy level at pre-determined set-point or to adjust to or maintain a change in trap occupancy level within a prescribed range (e.g., using clock signals and bias voltages applied to the photosensor).

20 Claims, 18 Drawing Sheets

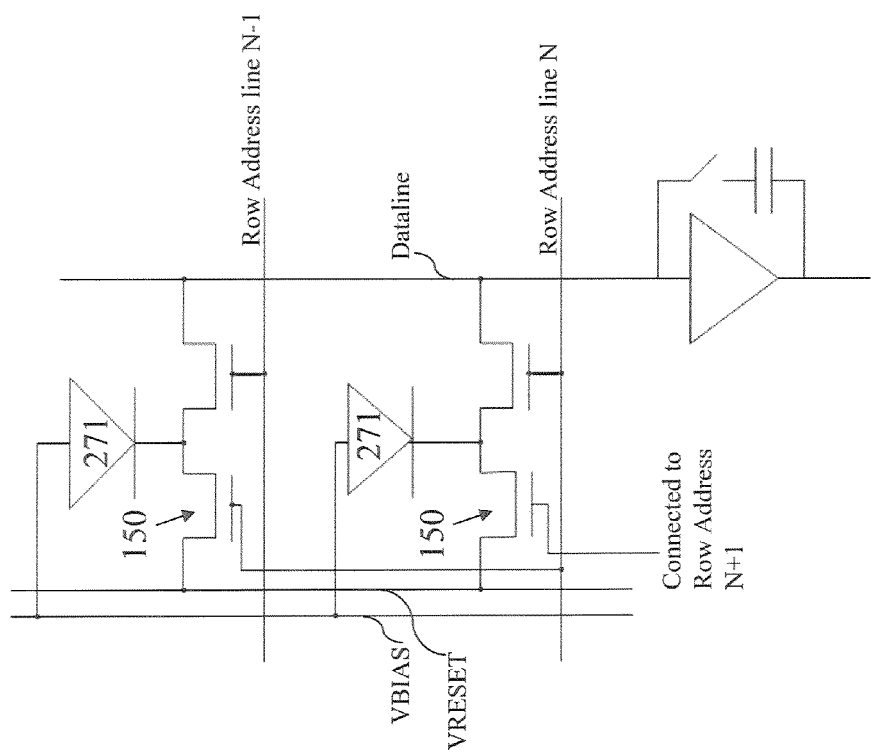

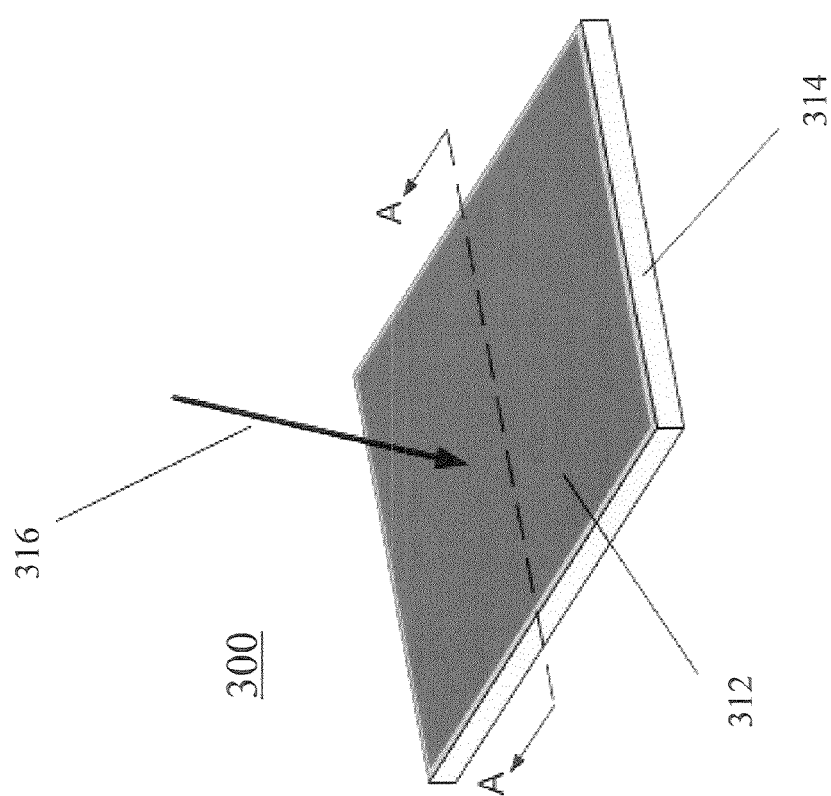

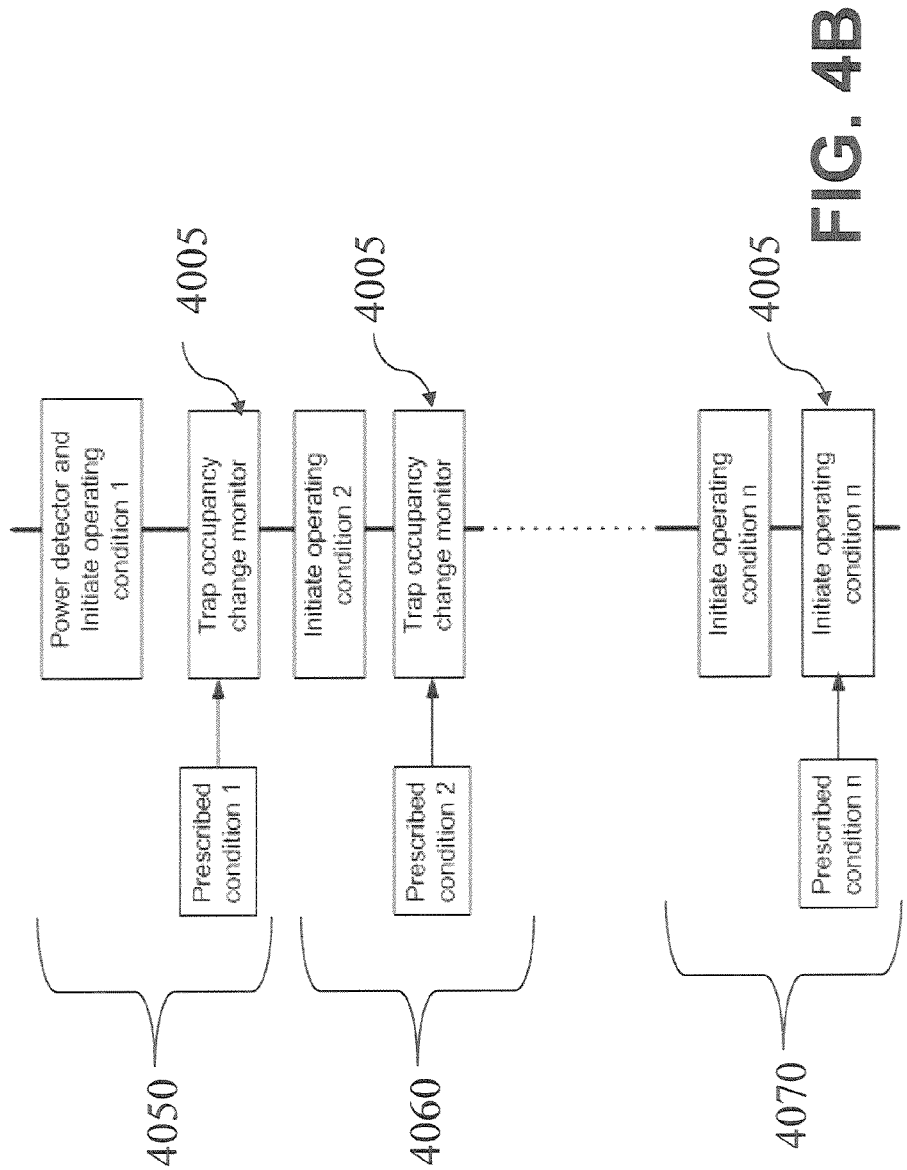

RADIOGRAPHIC DETECTOR INCLUDING TRAP OCCUPANCY CHANGE MONITOR AND FEEDBACK, IMAGING APPARATUS AND METHODS USING THE SAME

FIELD OF THE INVENTION

The invention relates generally to the field of medical imaging, and in particular to radiographic imaging and digital radiographic (DR) detectors and more particularly to mitigation of potential loss of image quality in x-rays images intended for diagnostic purposes related to the use of non-single crystalline materials in sensors.

BACKGROUND

Stationary radiographic imaging equipment are employed in medical facilities (e.g., in a radiological department) to capture medical x-ray images on x-ray detector. Mobile carts can include an x-ray source used to capture (e.g., digital) x-ray images on x-ray detector. Such medical x-ray images can be captured using various techniques such as computed radiography (CR) and digital radiography (DR) in radiographic detectors.

A related art digital radiography (DR) imaging panel acquires image data from a scintillating medium using an array of individual sensors, arranged in a row-by-column matrix, in which each sensor provides a single pixel of image data. Each pixel generally includes a photosensor and a switching element that can be arranged in a co-planar or a vertically integrated manner, as is generally known in the art. In these imaging devices, hydrogenated amorphous silicon (a-Si:H) is commonly used to form the photodiode and the thin-film transistor switch needed for each pixel. In one known imaging arrangement, a frontplane has an array of photosensitive elements, and a backplane has an array of thin-film transistor (TFT) switches.

As a result of the non-single crystalline structure of amorphous silicon, a large density of defect states exists within the photosensor. These defect states trap electrons and holes and release them with a time constant determined mainly by the energy level of the defect state, which is in some cases much longer than an imaging frame time. Generally, only trapped electrons of the photosensors are described herein, but it should be understood that holes can be trapped in a like manner and the same mechanisms apply to holes. Therefore, whenever the electric field within the photosensor/photodiode is perturbed either by electrons generated by light from an x-ray exposure, by the bias voltage being varied, or the like, trapped electrons within the photosensor are redistributed among these defect states, generating a detrapping current with a long time constant at the photosensor terminals.

Various U.S. patents address problems of large density of defect states of amorphous semiconductor materials (e.g., a-Si) and disclose various methods of operating DR detectors to reduce artifacts produced thereby. See for example, U.S. Pat. No. 5,920,070 (Petrick et al.) or U.S. Pat. No. 7,593,508 (Tsuchiya).

However, there is a need for improvements in the consistency and/or quality of medical x-ray images, particularly when obtained by an x-ray apparatus designed to operate with a-Si DR x-ray detectors.

SUMMARY OF THE INVENTION

An aspect of this application is to advance the art of medical digital radiography.

Another aspect of this application to address in whole or in part, at least the foregoing and other deficiencies in the related art.

It is another aspect of this application to provide in whole or in part, at least the advantages described herein.

An aspect of this application to is to provide methods and/or apparatus to address and/or reduce disadvantages caused by the use of portable (e.g., wireless) digital radiography (DR) detectors and/or radiography imaging apparatus using the same.

An aspect of this application to is to provide methods and/or apparatus that can monitor trap occupancy (e.g., trap occupancy change) in materials forming imaging sensors (e.g., photosensors) in radiographic detectors.

Another aspect of this application to is to provide methods and/or apparatus that can monitor of change in trap occupancy in materials forming imaging photosensors in radiographic detectors to determine whether an imaging array or detector panel has reached a stable operating point.

Another aspect of this application to is to provide methods and/or apparatus that can monitor of change in trap occupancy in materials forming imaging photosensors in radiographic detectors to enable the generator, thereby creating a radiographic exposure and/or to adjust the DR detector (e.g., photodiode) to maintain the change in trap occupancy level at prescribed level or characteristic.

An aspect of this application to is to provide methods and/or apparatus that can that can directly, repeatedly, or continuously monitor of photosensors in a DR detector by current monitoring and/or charge monitoring. Another aspect of the application is to provide methods and/or apparatus by which radiography imaging apparatus can be retrofit with trap occupancy change monitoring capabilities.

Another aspect of the application is to provide methods and/or apparatus by which DR detectors can perform a finalization procedure to achieve a finalization state or dynamically determine/select among a plurality of finalization procedures to achieve the finalization state.

In accordance with one embodiment, the present invention can provide a digital radiographic area detector that can include a plurality of pixels including electrically chargeable photosensors arranged over the area detector; a bias control circuit providing a bias voltage across the photosensors to charge each photosensor; at least one sensor configured to provide a reading responsive to light delivered to each photosensor; and a photosensor trap occupancy monitor coupled to at least one photosensor to measure trap occupancy of the at least one photosensor. The photosensor trap occupancy monitor can be a photosensor trap occupancy change monitor to measure trap occupancy change of the at least one photosensor.

In accordance with one embodiment, the present invention can provide a method of operating a digital radiographic detector including a plurality of photosensors arranged in rows and columns to produce at least one image signal can include changing an operating mode of the detector; measuring transient trap occupancy of a subset of the photosensors; and allowing an image control signal to be produced responsive to a prescribed condition of the transient trap occupancy. In accordance with one embodiment, the present invention can provide method of finalization of a digital radiographic detector including a plurality of photosensors arranged in rows and columns can include receiving a shut-down command to disable the detector; determining a current trap occupancy of at least one of the photosensors; selecting among a plurality of finalization procedures according to the current trap occupancy.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 2C is a diagram that shows a schematic of a pixel architecture for portion of an imaging array for a radiographic detector that can be used with an embodiment of a photosensor trap monitor according to the application.

FIG. 3A shows a perspective view of a portable wireless DR detector 300 that can have utility in radiography imaging apparatus applications.

FIG. 4B is a flowchart that shows an embodiment of a method of operating a DR detector according to the application.

DESCRIPTION OF EXEMPLARY EMBODIMENTS

Figure 1:
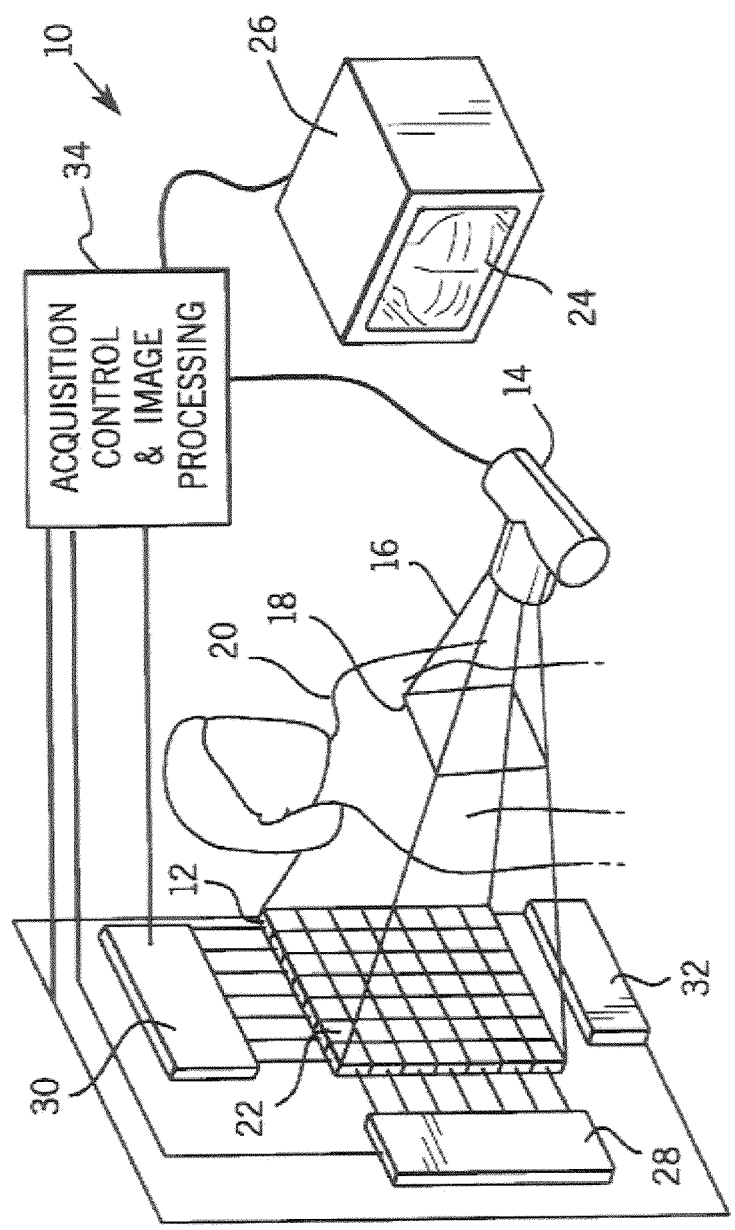
FIG. 1 is a diagram that shows a perspective view of a radiographic imaging apparatus including an area detector according to the present application as composed of rows and columns of detector cells in position to receive x-rays passing through a patient during a radiographic procedure.

The following is a description of exemplary embodiments of the invention, reference being made to the drawings in which the same reference numerals identify the same elements of structure in each of the several figures.

Where they are used, the terms "first", "second", and so on, do not necessarily denote any ordinal or priority relation, but may be used for more clearly distinguishing one element or time interval from another.

FIG. 1 is a diagram that shows a perspective view of an area detector according to the present application as composed of rows and columns of detector cells in position to receive x-rays passing through a patient during a radiographic procedure. As shown in FIG. 1, an x-ray system 10 that can use an area array 12 can include an x-ray tube 14 collimated to provide an area x-ray beam 16 passing through an area 18 of a patient 20. The beam 16 can be attenuated along its many rays by the internal structure of the patient 20 to then be received by the detector array 12 that can extend generally over a prescribed area (e.g., a plane) perpendicular to the central ray of the x-ray beam 16.

The array 12 can be divided into a plurality of individual cells 22 that can be arranged rectilinearly in columns and rows. As will be understood to those of ordinary skill in the art, the orientation of the columns and rows is arbitrary, however, for clarity of description it will be assumed that the rows extend horizontally and the columns extend vertically.

In exemplary operations, the rows of cells 22 can be scanned one (or more) at a time by scanning circuit 28 so that exposure data from each cell 22 may be read by read-out circuit 30. Each cell 22 can independently measure an intensity of radiation received at its surface and thus the exposure data read-out provides one pixel of information in an image 24 to be displayed on a monitor 26 normally viewed by the user. A bias circuit 32 can control a bias voltage to the cells 22.

Each of the bias circuit 32, the scanning circuit 28, and the read-out circuit 30, can communicate with an acquisition control and image processing circuit 34 that can coordinate operations of the circuits 30, 28 and 32, for example, by use of an electronic processor (not shown). The acquisition control and image processing circuit 34, can also control the examination procedure, and the x-ray tube 14, turning it on and off and controlling the tube current and thus the fluence of x-rays in beam 16 and/or the tube voltage and hence the energy of the x-rays in beam 16.

The acquisition control and image processing circuit 34 can provide image data to the monitor 26, based on the exposure data provided by each cell 22. Alternatively, acquisition control and image processing circuit 34 can manipulate the image data, store raw or processed image data (e.g., at a local or remotely located memory) or export the image data.

Exemplary pixels 22 can include a photo-activated image sensing element and a switching element for reading a signal from the image-sensing element. Image sensing can be performed by direct detection, in which case the image-sensing element directly absorbs the X-rays and converts them into charge carriers. However, in most commercial digital radiography systems, indirect detection is used, in which an intermediate scintillator element converts the X-rays to visible-light photons that can then be sensed by a light-sensitive image-sensing element.

Examples of image sensing elements used in image sensing arrays 12 include various types of photoelectric conversion devices (e.g., photosensors) such as photodiodes (P-N or PIN diodes), photo-capacitors (MIS), photo-transistors or photoconductors. Examples of switching elements used for signal read-out include MOS transistors, bipolar transistors and p-n junction components.

Figure 2A:
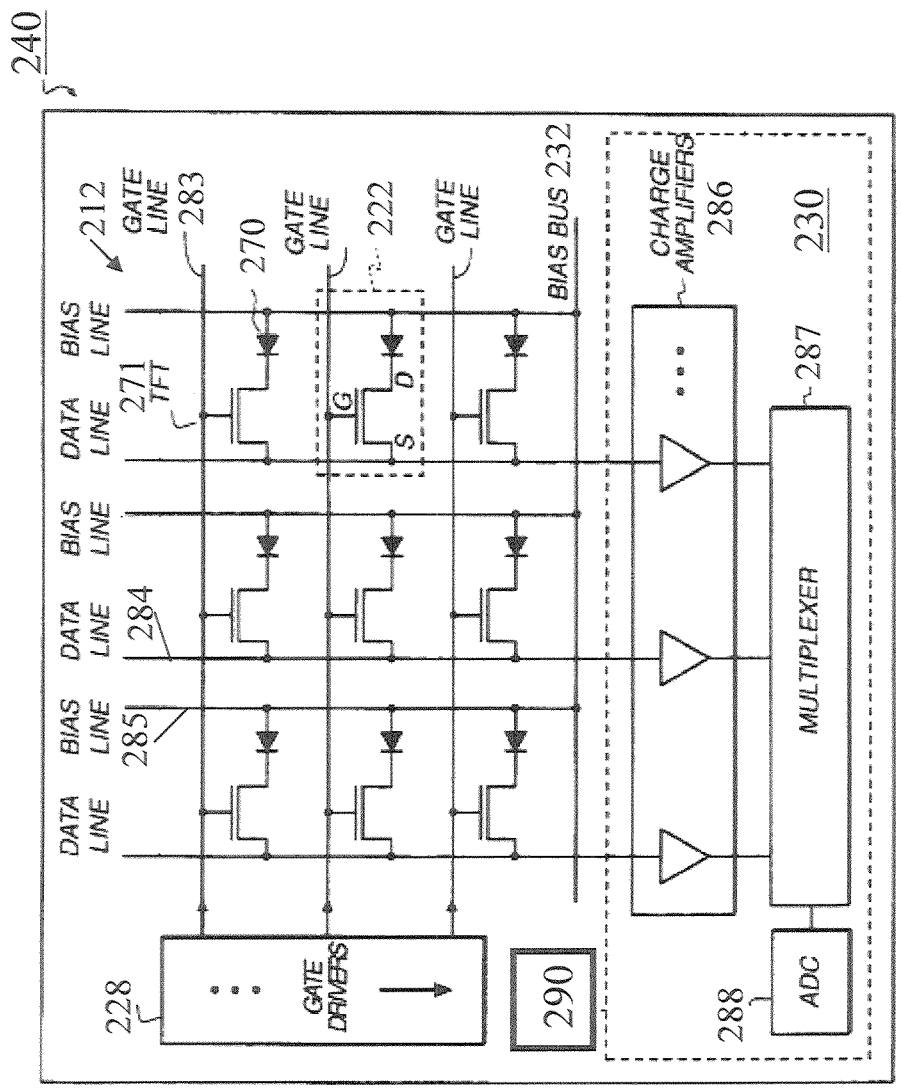
FIG. 2A is a diagram that shows schematic of a portion of an imaging array for a radiographic detector including a photosensor trap monitor embodiment according to the application.

FIG. 2A is a diagram that shows a schematic of a portion of an imaging array for a radiographic detector including an embodiment of a photosensor trap monitor according to the application. As shown in FIG. 2A, a schematic of a portion of an exemplary flat panel imager 240 can include an array 212 having a number of a-Si:H n-i-p photodiodes 270 and TFTs 271. Gate driver chips 228 can connect to the blocks of gate lines 283, readout chips 230 can connect to blocks of data lines 284, and bias lines 285 can connect to a bias bus or variable bias reference voltage. Charge amplifiers 286 can be provided that receive signals from the data lines. An output from the charge amplifiers 286 can go to an analog multiplexer 287 or directly to an analog-to-digital converter (ADC) 288 to stream out the digital image data at desired rates.

In a hydrogenated amorphous silicon (a-Si:H) based indirect flat panel imager of FIG. 2A, incident X-ray photons are converted to optical photons, which are subsequently converted to electron-hole pairs within the a-Si:H n-i-p photodiodes 270. An exemplary cell 222 can include a photodiode 270 having its cathode connected to the source (e.g., drain) of an FET 271. A bias circuit 232 can control a bias voltage to the cells 222. The pixel charge capacity of the photodiodes is a product of the bias voltage and the photodiode capacitance. In general, a reverse bias voltage is applied to the bias lines 285 to create an electric field (and hence a depletion region) across the photodiodes and enhance charge collection efficiency. The image signal can be integrated by the photodiodes while the associated TFTs 271 are held in a non-conducting ("off") state, for example, by maintaining the gate lines 283 at a negative voltage. The array can be read out by sequentially switching rows of the TFTs 271 to a conducting state by means of TFT gate control circuitry. When a row of pixels is switched to a conducting ("on") state, for example by applying a positive voltage to the corresponding gate line 283, charge from those pixels can be transferred along data lines 284 and integrated by external charge-sensitive amplifiers 286. The row can then be switched back to a non-conducting state, and the process is repeated for each row until the entire array has been read out. The signal outputs from the external charge-sensitive amplifiers 286 are transferred to an analog-to-digital converter (ADC) 288 by a parallel-to-serial multiplexer 287, subsequently yielding a digital image. The flat panel imager having an imaging array as described with reference to FIG. 2 is capable of both single-shot (e.g., static, radiographic) and continuous (e.g., fluoroscopic) image acquisition.

A trap occupancy detector unit 290 can be operatively coupled to photodiodes 270 in imaging array 212 to provide a signal to a controller such as an image processor of a radiographic imaging apparatus. Exemplary embodiments of trap occupancy monitors 290 can actively monitor of trap occupancy or rate of change of trap occupancy of photodiodes 270 by current monitoring, charge monitoring, or the like. Alternatively, the trap occupancy detector unit 290 can cumulatively or periodically, or interpolate multiple (e.g., at least two) measurements related to trap occupancy or change in trap occupancy. Exemplary embodiments of the trap occupancy monitor 290 can actively monitor of trap occupancy or rate of change of trap occupancy of photodiodes 270 either directly or indirectly. As shown in FIG. 2A, photosensor trap occupancy detector unit 290 can be electrically coupled to an anode and/or a cathode of photodiodes 270 in pixels in the imaging array 212 to monitor change in trap occupancy. According to embodiments of the application, the photosensor trap occupancy detector unit 290 can be connected to at least one pixel, some rows or columns (e.g., contiguous or intermittent) of pixels, a subset of pixels or all pixels in the imaging array 212. Alternatively, a sparse matrix of pixels may be included within the imaging array 212 for the specific purpose of monitoring trap occupancy or rate of change of trap occupancy; such sparse pixels are not later used as part of the radiographic image and the value of the image at the location of the sparse pixels can be determined by interpolation of neighboring pixels. Alternatively, rows or columns of pixels outside the perimeter of the image area of the imaging array 212 can be used specifically for the purpose of monitoring rate of change of trap occupancy; these pixels are not later used as part of the radiographic image. All or some of these pixels used for trap occupancy monitoring can be light-shielded. When monitoring a rate of change of trap occupancy for a light-shielded pixel, such monitoring can encompass changes caused by bias or other changes in operating conditions such as integration time.

Figure 2B:
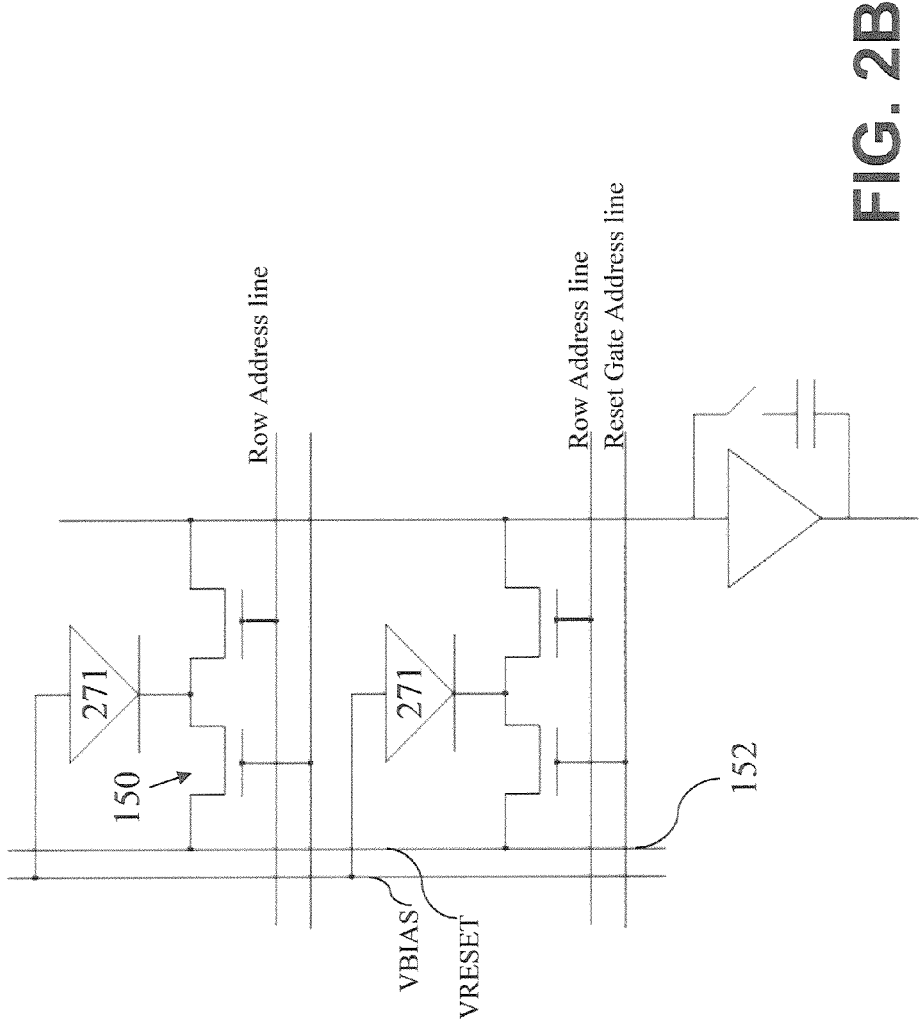
FIG. 2B is a diagram that shows a schematic of a pixel architecture for portion of an imaging array for a radiographic detector that can be used with an embodiment of a photosensor trap monitor according to the application.

FIG. 2B is a diagram that shows a schematic of a pixel architecture for portion of an imaging array for a radiographic detector that can be used with an embodiment of a photosensor trap monitor according to the application. As shown in FIG. 2B, another exemplary pixel of a flat-panel imaging array can include a second transistor and second bias line in each pixel for the purpose of re-setting the photodiode to the second bias line potential. In the exemplary pixel, a second transistor 150 can be used to reset a portion or all of the pixels to a reset voltage (e.g., VRESET) prior to exposure. Additionally, the reset potential can be clocked in order to sequentially reset the photosensors to a first potential and then a second potential. For example, the first potential may bring the photosensor or photodiode 271 to a forward bias in order to fill traps, followed by a reverse bias to empty traps, thereby erasing memory of the previous state of the photodiode 271. A trap occupancy detector unit can be operatively coupled to the reset bias line 152 to monitor the change in trap occupancy. In another variant of the pixel design of FIG. 2A as shown in FIG. 2C, the reset transistor 150 for row N−1 can be electrically coupled to the row address line for row N, which can reduce the number of global traces and/or also providing for simultaneous reading the signal (e.g., photodiodes 271) of row N while resetting photosensors of row N−1.

Figure 2D:
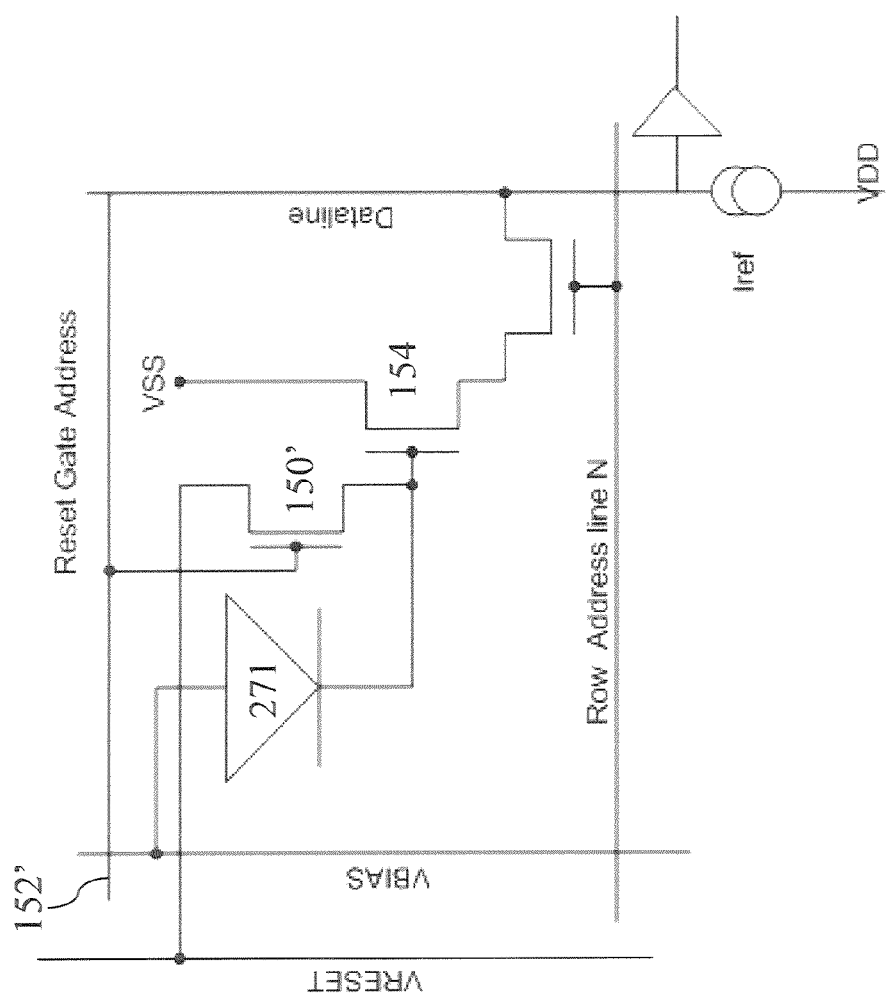
FIG. 2D is a diagram that shows a schematic of a pixel architecture for portion of an imaging array for a radiographic detector that can be used with an embodiment of a photosensor trap monitor according to the application.

FIG. 2D is a diagram that shows a schematic of a pixel architecture for portion of an imaging array for a radiographic detector that can be used with an embodiment of a photosensor. As shown in FIG. 2D, an exemplary active pixel of a flat-panel imaging array can include a second transistor 150' and second bias line 152' in each pixel for the purpose of re-setting a photosensor or photodiode 271 to the second bias line potential and an amplifier transistor 154 for providing signal amplification. In the pixel, the reset transistor 150' can be used to reset a portion or all of the pixels to a reset voltage prior to exposure. Current sources on each dataline can provide a reference current for the pixel amplifier transistor 154 and sampling circuits on each dataline can sample the change in dataline voltage caused by the charge sensed on the gate of the amplifier transistor. Prior to exposure, a reset bias (e.g., VRESET) can be clocked to sequentially reset the photodiodes 271 to a first potential and then a second potential. For example, the first potential may bring the photosensor or photodiode 271 to a forward bias in order to fill traps, followed by a reverse bias to empty traps, thereby erasing memory of the previous state of the diode. During readout, the row address gate can switch the row transistor to a conducting state and the voltage amplifier on each column senses the change in dataline voltage. Additionally, the reset gate may be switched to reset the photodiode and a second sample of the dataline voltage obtained for a dark reference. In exemplary pixels shown in FIGS. 2A-2D, embodiments of a trap occupancy detector unit can be operatively coupled to the reset bias line to monitor trap occupancy or the change in trap occupancy. Alternatively, one or more trap occupancy detector units can be operatively coupled to one or more datalines (e.g., to sense charge or the amplified signal such as voltage from the group of one or more photosensors).

Figure 3B:
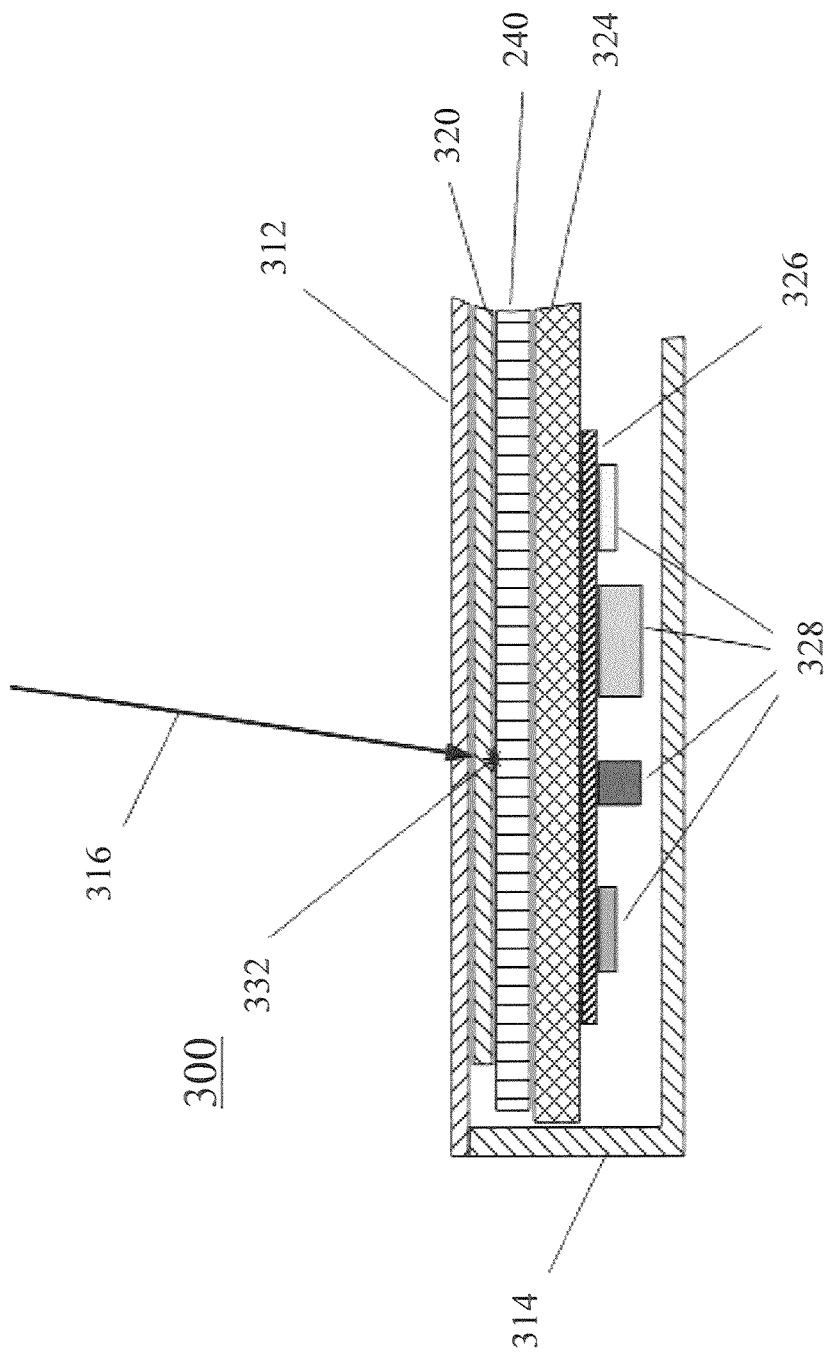
FIG. 3B is a diagram that shows a portion of a cross-sectional view along section line A-A of the portable wireless DR detector of FIG. 3A.

FIG. 3A shows a perspective view of a portable wireless DR detector 300 according to embodiments of the application that can have utility in radiography imaging apparatus applications. FIG. 3B shows a portion of a cross-section view along line A-A of the DR detector 300. As shown in FIGS. 3A-3B, the portable DR detector 300 can enclose the imager 240 including the imaging array 212.

In one embodiment, the DR detector 300 can include an enclosure 314 including top panel cover 312 made of material that passes x-ray flux 316 without significant attenuation. Scintillator 320 can be under (e.g., directly connected) the cover 312, the imaging array 212 can be under the scintillator 320, and readout electronics can be co-planar with the imaging array 212, partially below support member 324 or on a flexible connector therebetween. The x-ray flux 316 can pass through the top panel cover 312, impinge upon scintillator 320 where stimulation by high-energy photons in the x-ray flux 316 can cause the scintillator 320 to emit low energy photons 332.

The support member 324 can be included to securely and/or robustly mount the imager 240 and can further operate as a shock absorber between components therein and the enclosure 314. Device electronics required for proper operation of the detector can be mounted within the enclosure 314 and can include electronic components 328 (e.g., processors, FPGAs, ASICs, chips, etc.) that can be mounted on one or more separate and/or interconnected circuit boards 326.

DR detectors can transition from a zero-power state to a stable state ready for exposure in approximately 1 second, however under selected conditions or selected applications, an exemplary time can be substantially decreased or increased (e.g., 300 milliseconds to 10 seconds). During the zero power state, the photodiode bias can be 0V and the traps in a PIN photodiode can be completely filled, which can take 1 minute, 5 minutes, 10 minutes, 60 minutes or more. During power-up, application of non-zero bias to the photodiode causes the traps to emit. The rate of trap emission and therefore the time required to reach a stable operating point can depend on at least temperature, non-zero decode bias, time since last image sequence, and/or readout timing.

As described herein, the DR detector 300 can be required to switch operating modes either within a given examination procedure or between examination procedures. For example, in tomosynthesis, multiple frames at low dose and high frame rate may be captured for volumetric analysis and a single projection image can be obtained at low frame rate and high dose. In fluoroscopy or in image-guided surgery, the DR detector 300 can operate in a high-frame-rate, low X-ray exposure mode to capture motion, then freeze-frame capture a higher dose, lower frame rate image. Alternatively, the lower frame rate capture can be taken before (or intermixed) the higher frame rate capture. An exemplary change in operating mode for the DR detector 300 can result in a transient decay in the trap occupancy in photosensors as the photosensors adjust to new (e.g., later or subsequent) exposure levels, array timing, clocking signals (e.g., resets), bias voltages or the like. As used herein, a clocking signal can be a signal (e.g., digital) used to control timing of imaging arrays or signal processing such as pulsed signals (e.g., voltage) provided to components such as gate lines, bias lines, photosensors, etc., including a variable voltage level or variable duration to fill/increase a trap occupancy level, spill/decrease a trap occupancy level, a variable number of fill pulses, a variable number of spill pulses or various combinations thereof.

In related art radiographic detectors, a fixed delay time can be used to for amorphous silicon or amorphous selenium, which can result in unnecessary delays and/or in exposure and image capture prior to a transient trap emission decay.

Figure 4A:
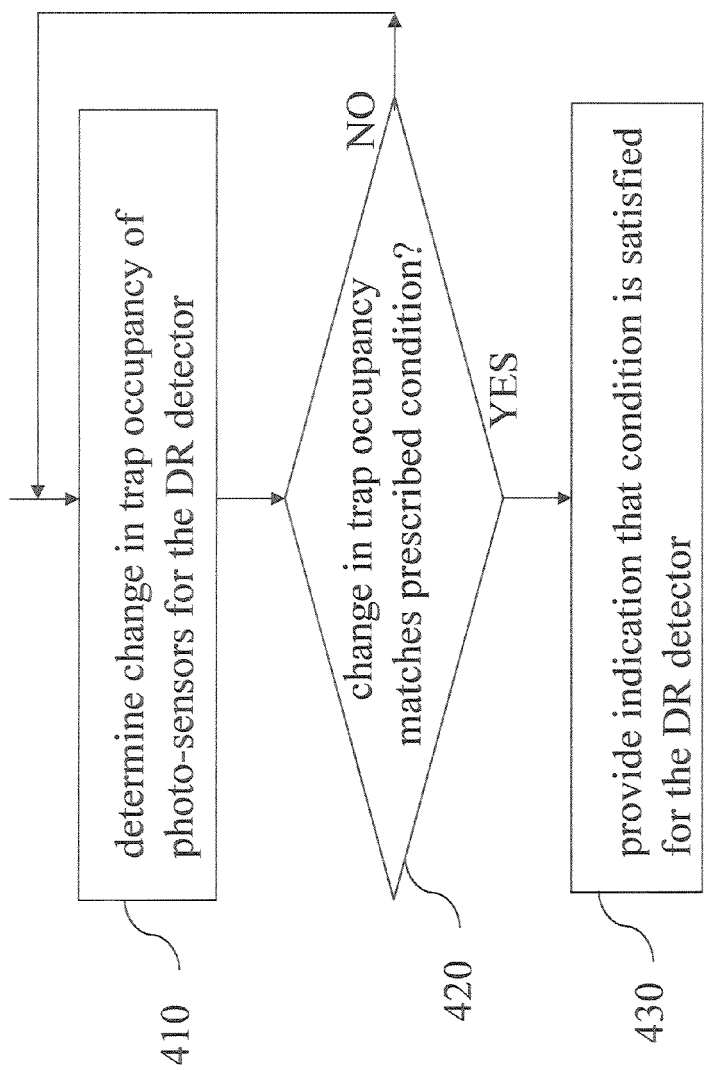
FIG. 4A is a flowchart that shows an embodiment of a method of operating a DR detector according to the application.

Referring to FIG. 4A, a flow chart that shows an exemplary method of operating a DR detector according to embodiments of the application will now be described. As shown in FIG. 4A, the method for operating a DR detector will be described using and can be implemented by embodiments of radiographic imaging apparatus shown in FIGS. 1-3B; however, the method of FIG. 4 is not intended to be limited thereby.

As shown in FIG. 4A, a subset of pixels in an imaging array of a DR detector can be monitored for a trap occupancy change condition of the pixels (e.g., photosensors) at operation block 410. The subset of pixels can be representative of a portion, multiple portions or the entire imaging array. Exemplary monitoring can be real-time or active monitoring, for example, by charge monitoring of photosensors in the pixels or by current monitoring of photosensors in the pixels.

The monitored or detected trap occupancy of the pixels can be compared to a prescribed condition at operation block 420. For example, the prescribed condition can be a first threshold level, which can be satisfied by the monitored trap occupancy condition (e.g., change in trap occupancy) being above or below the first threshold. An exemplary monitored change in trap occupancy condition can be repeatedly independently measured or cumulatively measured. Alternatively, a change in trap occupancy condition can be satisfied by comparison between subsequent iterative detections (e.g., consecutive, a prescribed sequence) for the change in trap occupancy condition. The comparison between subsequent detections can be a combined signal (e.g., difference) or rate of change that can be compared to (e.g., below) a second threshold. In addition, the change in trap occupancy can be estimated from two or more readings (e.g., interpolated) to be compared to the first threshold or the second threshold.

When it is determined that the condition of operation block 420 is satisfied, control can continue to operation block 430, where an indication or signal can be provided (e.g., by the DR detector 300) to indicate satisfaction of the trap occupancy condition (e.g., change in trap occupancy). For example, a signal can be output to allow initiation of an x-ray exposure of an object to be imaged by the DR detector 300.

In one embodiment, an examination procedure can include a series of radiographic exposures. For example, an image exposure can be preceded or followed by one or more dark images. Alternatively, an examination procedure can include a plurality of images passing through different orientations (e.g., front to back, back to front, medial side-to-side, lateral side-to-side and/or at an oblique angle) of a selected portion of an object such as a chest or foot of a patient. Each of the images of the examination procedure can be preceded or followed by one or more prep images (e.g., dark images). According to embodiments of the application, a change in trap occupancy condition can be monitored before each examination procedure or between each image including prep images or dark images of an examination procedure.

Referring to FIG. 4B, a flow chart that shows an exemplary method of operating a DR detector according to embodiments of the application will now be described. As illustrated in FIG. 4B, operation blocks of FIG. 4A can be repeated for a sequence of procedures requiring multiple changes in radiographic detector operating modes. For example, upon power-up the detector can be operated sequentially in a number of operating modes in order to ready the detector for exposure. Such exemplary operating modes can have different diode biases, different clock signals to the transistors in the pixel or peripheral circuitry. For each operating condition, a corresponding prescribed condition would be used for the trap occupancy monitor. A match between the prescribed condition and the condition sensed by the occupancy monitor can enable initiation of the next operating condition. For the example of a wireless portable radiographic detector, operation blocks 4050 of FIG. 4B can be employed during detector power-up to ready the detector for exposure. A second set of operation blocks 4060 of FIG. 4B can be employed between exposure and capture of one or more dark reference frames, and a third set of operation blocks 4070 of FIG. 4B can be employed upon power-down. As shown in FIG. 4B, up to N sets of operation blocks such as operation blocks 4050 can be used. Further, exemplary operation block 4005 can be a combination of operation blocks 410, 420, 430 of FIG. 4A. For the example of a fluoroscopic detector with static capture, the steps of FIG. 4B can be repeated between transitions from the fluoroscopic operating mode and the static capture mode.

In another embodiment, operations of the DR detector can be intermittent with an exposure occurring seconds to minutes apart. Under such image operating conditions, it can be advantageous to control the change in trap occupancy to be a selected or desired level or to fall within a prescribed range of change in trap occupancy.

Figure 5:
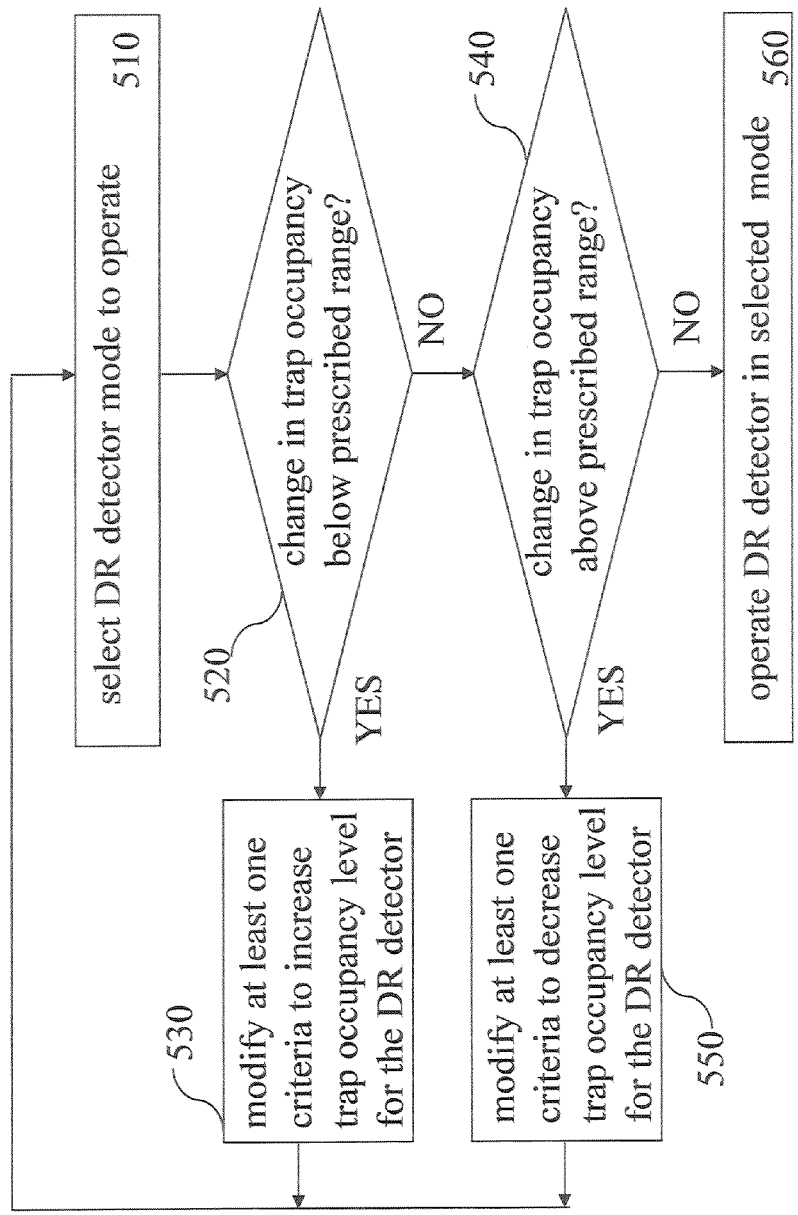
FIG. 5 is a flowchart that shows another embodiment of a method of operating a DR detector according to the application.

Referring to FIG. 5, a flow chart that shows an exemplary method of operating a DR detector according to embodiments of the application will now be described. As shown in FIG. 5, the method for operating a DR detector will be described using and can be implemented by embodiments of radiographic imaging apparatus shown in FIGS. 1-3B; however, the method of FIG. 5 is not intended to be limited thereby.

As shown in FIG. 5, a DR detector can be enabled for operations at operation block 510. Exemplary modes of operation can be stand-by, power-down mode, power-up mode, fluoroscopic mode, tomosynthesis mode, dual imaging mode, general radiation mode or the like.

As shown in FIG. 5, a subset of pixels in an imaging array of a DR detector can be monitored to determine whether a change in trap occupancy condition of the pixels (e.g., photosensors) falls within a desired range of occupancy levels at operation block 520. The subset of pixels can be representative of a portion, multiple portions or the entire imaging array, selected rows (e.g., adjacent, intermittent, grouped, periodic), or selected columns (e.g., adjacent, intermittent, grouped, periodic). Exemplary monitoring can be real-time or active monitoring, for example by charge monitoring of photosensors in the pixels or by current monitoring of photosensors in the pixels.

The monitored or detected change in trap occupancy of the pixels can be compared to a prescribed range (e.g., lower and upper levels of the prescribed change in trap occupancy range) at operation block 520 and operation block 540. When it is determined that a current detected change in trap occupancy value is below the prescribed range (operation block 520), a criteria (e.g., condition at the imaging array) at the DR detector 300 can be modified to increase the change in trap occupancy level at operation block 530. When it is determined that a current detected change in trap occupancy value is above the prescribed range (operation block 540), a criteria (e.g., condition at the imaging array) at the DR detector 300 can be modified to decrease the change in trap occupancy level at operation block 550. Exemplary criteria to be modified can include bias voltage, clocking signals, reset value of a reset operation of the imaging array, frequency or duration of a reset operation, optical stimulation of the photosensor or the like. Modified criteria of operation block 530 can be the same or different from the criteria of operation block 550.

When it is determined that a current detected change in trap occupancy value is within the prescribed range (operation block 540, NO), control can continue to operation block 560 for selected DR detector 300 operations.

Exemplary methods described herein of monitoring trap occupancy or change in trap occupancy of photosensors of pixels can provide for more accurate exposure condition for the DR detector, decreased preparation DR detector time (e.g., faster imaging procedures) or more reliable/repeatable conditions for the DR detector during a plurality of x-ray exposures.

For detector operation involving sequential application of a series of operating modes, the steps of FIG. 5 can be repeated with criteria for the desired trap occupancy or change in trap occupancy and criteria to increase and to decrease trap occupancy for each operating mode.

Exemplary non-limiting embodiments of change in trap occupancy monitors will now be described; however, embodiments of the application are not intended to so limited.

FIGS. 7A-7D are diagrams that illustrate exemplary embodiments of a trap occupancy monitor in a DR detector according to the application. Embodiments of a trap occupancy monitor can be operatively coupled to photosensors 770 in imaging array 780 (e.g., using bias lines, data lines, reset lines or read out electronics) to provide a signal to a controller within or external to the DR detector 300 such as an image processor of a radiographic imaging apparatus. Exemplary embodiments of a trap occupancy monitor can actively monitor of change in trap occupancy of photosensors by current monitoring, charge monitoring, or the like where the monitoring can be repeatedly performed.

Figure 6:
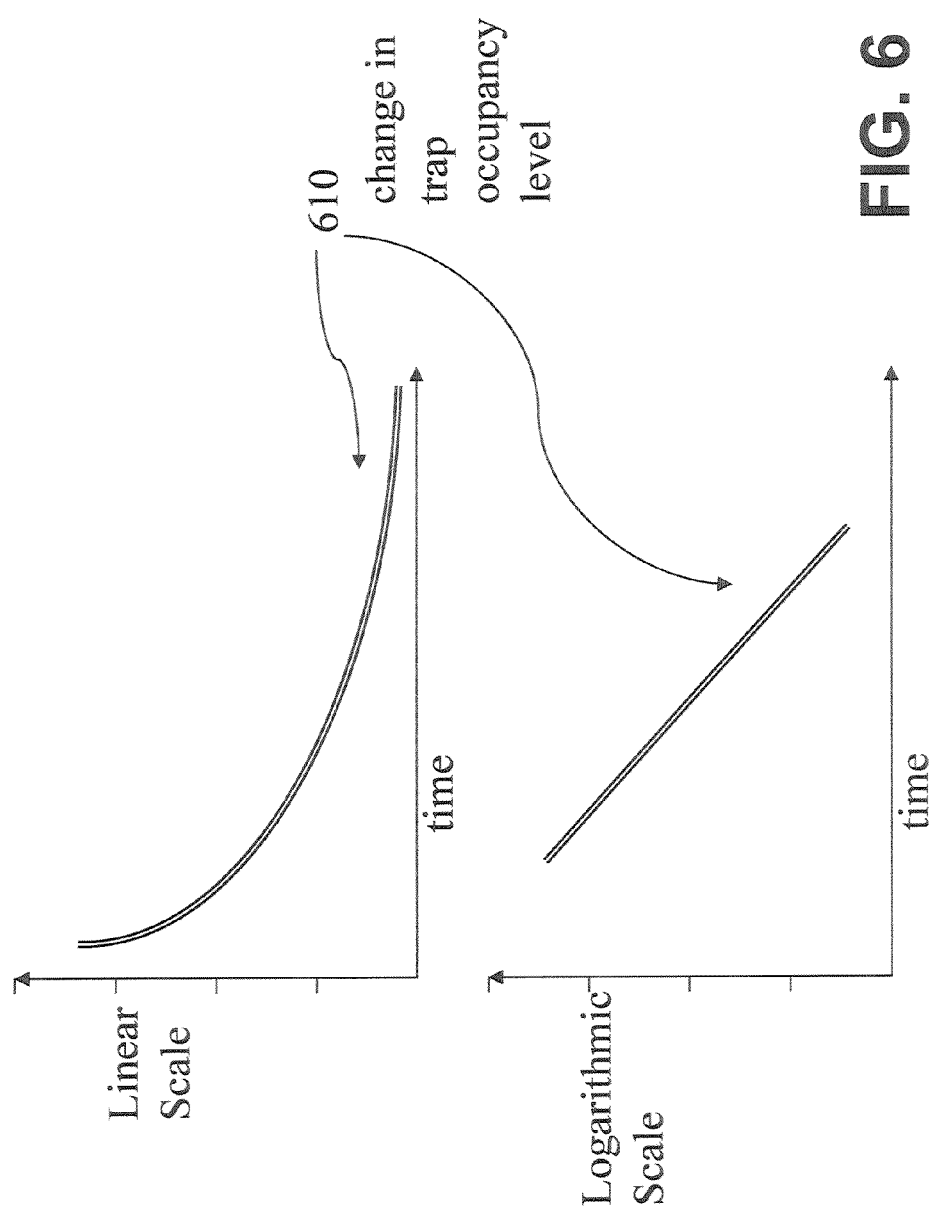
FIG. 6 is a diagram that shows an exemplary characteristic of amorphous semiconductor materials.

Exemplary embodiments of a current-type change in trap occupancy monitor unit in a DR detector can set some photosensors, a subset or all of the photosensors to a conductive state, which can allow the trap emission current (e.g., rate of change of current) to be monitored as a function of time as selected (e.g., after power-up, operation mode change, or as desired). Generated trap emission current can decay exponentially with time as the quasi-fermi level moves towards its equilibrium position. Thus, as detected by a current-type change in trap occupancy monitor embodiment, a trap emission current transient resulting from changes in bias levels, clocking signal levels or timing (such as observed during power-up or during change of the detector from one operating mode to another) can decay in an exponential fashion. An exemplary transient change in trap occupancy characteristic for amorphous semiconductor materials is shown in FIG. 6. As shown in FIG. 6, an exemplary change in trap occupancy level 610 is shown on a logarithmic scale and a linear scale plotted on a vertical axis with time being the horizontal axis. In one embodiment, the generated trap-emission current can be determined by current sensing either (a) in the anode bias voltage supply, (b) at the cathode of a photosensor, (c) in the reference voltage supply to the readout integrated circuit (ROIC) (e.g., using a switch to connect Vref to the datalines), or (d) in the ROIC (e.g., charge amplifier). Monitoring such a generated transient generated trap-emission current can be used to determine when the change in trap occupancy is approaching a steady-state condition, a cumulative value and/or a threshold.

Figure 7A:
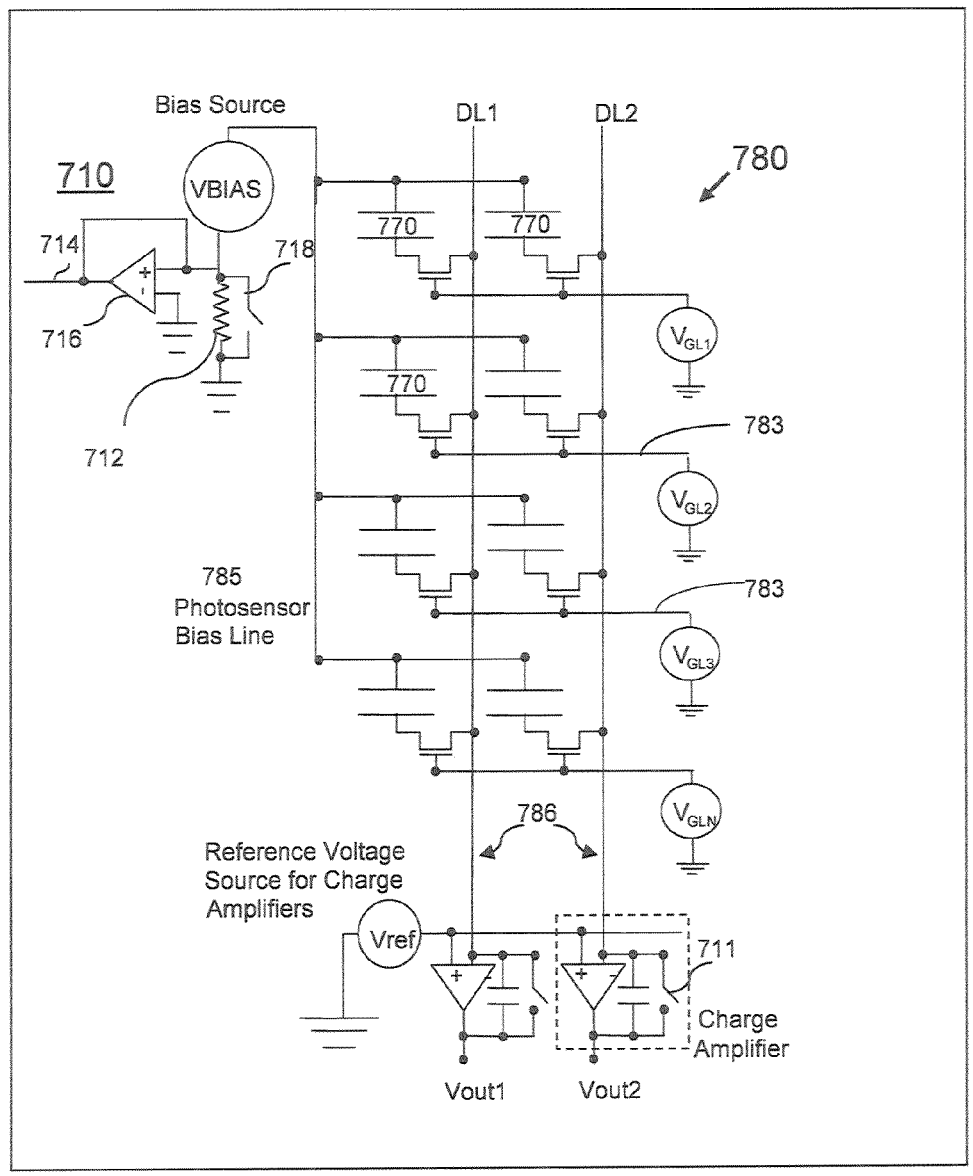
FIG. 7A-7D are diagrams that show schematic of a portion of an imaging array for a radiographic detector including exemplary photosensor trap monitor embodiments according to the application.

FIG. 7A is a diagram that illustrates a current monitoring embodiment of a trap occupancy monitor in a DR detector according to the application. As shown in FIG. 7A, a bias current-type change in trap occupancy monitor 710 can be coupled to an anode bias voltage $V_{BIAS}$ of the photosensors 770. After reset of the photosensors 770, the transient trap emission current across resistor 712 can be monitored using a measured voltage 714 at the output of an amplifier 716. The amplifier 716 can operate as a voltage follower, which can include a prescribed gain. The resistor 712 (e.g., the bias current-type change in trap occupancy monitor 710) can be bypassed using switch 718 such as during exposure/image data collection, image data readout or pixel reset operations. As the bias voltage $V_{BIAS}$ supplies the entire imaging array, a more accurate reading may be obtained by using all photosensors 770 and a global reset with the current type change in trap occupancy monitor 710. Further, the bias current change in trap occupancy monitor 710 can be co-located with the bias voltage supply, for example, below the support member at the electronic components 328 (e.g., on a PCB where $V_{BIAS}$ is generated).

Figure 7B:
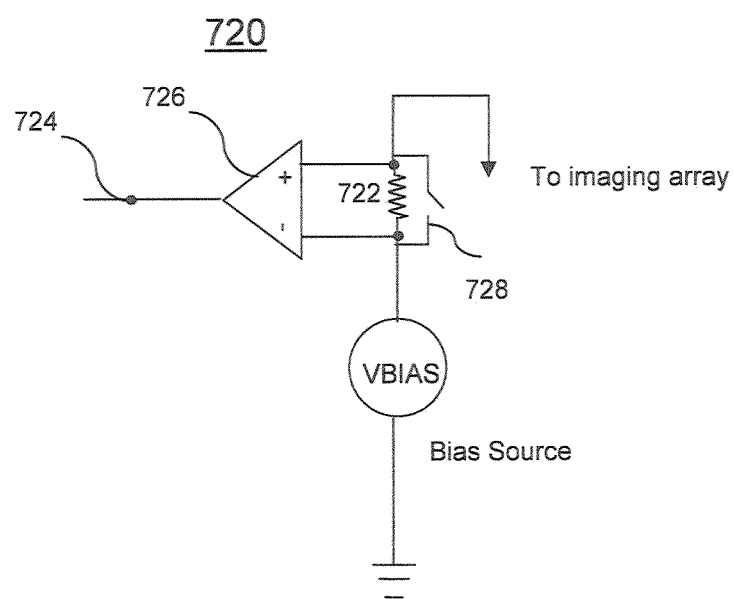

Alternatively, a current-type change in trap occupancy monitor 720 as shown in FIG. 7B can measure a voltage drop across resistor 722 using a measured voltage 724 at the output of amplifier 726 to determine or monitor the transient trap emission current. The amplifier 726 can operate as a differential amplifier. Similarly, the resistor 722 can be bypassed using switch 728. For embodiments of the current-type change in trap occupancy monitor 710, 720, a cathode of the photosensor 770 can be connected to a reference voltage Vref such as via datalines 786 by enabling gatelines 783 and one or more switches 711.

Figure 7C:
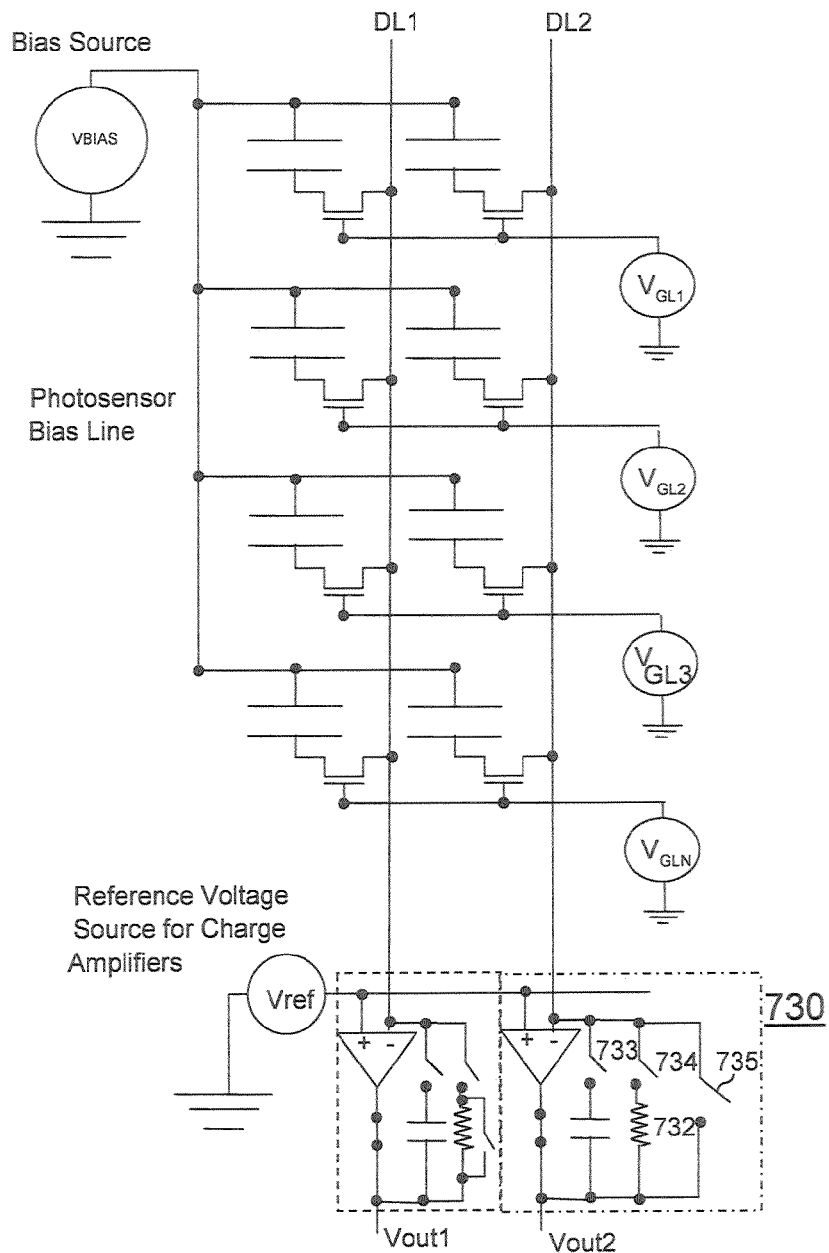

FIG. 7C is a diagram that illustrates a current monitoring embodiment of a trap occupancy monitor in a DR detector according to the application. As shown in FIG. 7C, a current-type change in trap occupancy monitor 730 can use a modified charge amplifier electrically coupled to an anode of photosensors 770. After reset (e.g., global reset), the current-type change in trap occupancy monitor 730 can bypass a capacitor (e.g., to read out the imaging array) by opening switch 733, close switch 734 to generate a transient trap emission current across resistor 732, which can be measured at the output Vout2 of the charge amplifier. The resister 732 can be bypassed using switch 735 (e.g., to reset the photosensors) and/or the resister 732 can be removed (isolated) from the imaging array using switch 734.

Exemplary embodiments of current-type change in trap occupancy monitors can be used to achieve a substantially repeatable or identical steady state of the DR detector 300 for an examination procedure or between exposures (e.g., dark or image) in an examination procedure or between separate procedures (e.g., on the same or different patients). Accordingly, the current decay can be monitored by the current-type trap occupancy monitors until separate or consecutive readings are nearly identical or a difference is below a threshold, which could be set responsive to the examination procedure. For example, a low dose procedure can use a smaller threshold (e.g., a more stable detector) than a general radiation procedure. In one embodiment, change in trap occupancy measurements can be taken at 100 msec intervals, 200 msec intervals, 0.5 second intervals, 1 second intervals or 2 second intervals. Alternatively, the intervals between change in trap occupancy measurements can be made larger or smaller.

Exemplary embodiments of a charge-type trap occupancy monitor in a DR detector can set some photosensors, set a subset or set all of the photosensors to a conductive state, which can allow the trap emission charge to be monitored as a function of time as selected (e.g., after power-up, operation mode change, or as desired). In one embodiment, signal charge measured at the ROTC can be the number of carriers emitted from traps during a corresponding time interval. A transient trap emission charge resulting from changes in bias levels, clock levels or timing (such as observed during power-up or during change of the detector from one operating mode to another) can decay in an exponentially with time.

Figure 7D:
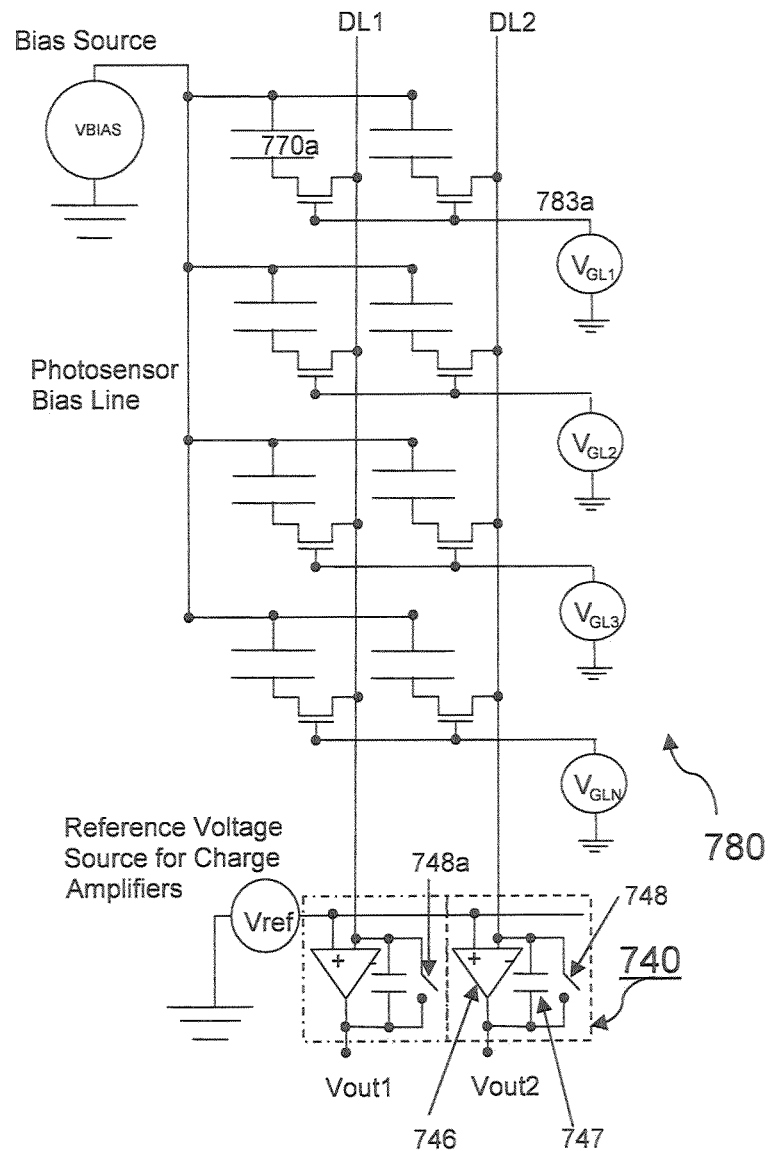

FIG. 7D is a diagram that illustrates a charge monitoring embodiment of a trap occupancy monitor in a DR detector according to the application. As shown in FIG. 7D, a charge-type change in trap occupancy monitor 740 can use the charge amplifiers to measure the transient trap charge emission by collecting the transient trap charge emission in a capacitor 747, which can be repeatedly measured using the amplifier 746 (integrated at a capacitor of the amplifier 746). The trap charge emission can measured using the amplifier 746 by integrating transient trap emission charge over time at the capacitor, read out/measure the integrated charge as a voltage at the output of the amplifier 746, and then reset the capacitor; and repeat. Alternatively, the transient trap emission charge can be integrated cumulatively over time at the capacitor of the charge amplifier (without capacitor reset) and repeatedly measured.

As shown in FIG. 7D, an exemplary reset procedure for a pixel or pixels can establish a reverse bias across the photosensor 770 (e.g., PS 770a). This can be accomplished by closing a charge amplifier reset switch (e.g., 748a) and turning the row select TFTs (e.g., 783a) on. Anodes of the photosensor(s) 770a can then be set to Vbias, while the cathode of the photosensor can be set to Vref. For a reverse bias condition Vref>VBIAS. When all photosensors 770 are reset and row select TFTs are turned off, the imaging array 780 can be considered ready for exposure. Once the pixel or pixels are reset, one to all gate lines 783 and one to all data lines 786 can be turned on and the imaging array 780 (or a portion thereof) can be considered ready for change in trap occupancy monitoring or controlled change in trap occupancy level maintaining according to system and/or method embodiments of the application.

After reset, in one embodiment the charge-type change in trap occupancy monitor 740 can monitor change in trap occupancy using the steps of (a) trap emission charge collection at the capacitor 747, (b) output/measurement of the collected charge using the amplifier 746 and (c) reset of the capacitor 747 using a switch 748, which can be repeated until a selected change in trap occupancy level of the photosensors 770 can be determined (e.g., using one or more charge measurements). Exemplary transient trap charge emission measurements can be taken at intervals such as 10 microseconds, 100 microseconds, 500 microseconds or more.

In one embodiment for operating the charge-type change in trap occupancy monitor 740 to monitor of trap emission/occupancy, the DR detector 300 can be continuous read-out, for example, at a high frame rate and a short integration time (or no integration time) preceding each read-out. An exemplary frame time used in such a continuous read-out mode for an imaging array (e.g., 3K×3K pixels) for the DR detector 300 can be <200 ms. In such a continuous read-out operating mode, a signal charge measured by the ROIC can be the number of carriers emitted from traps during the frame time. Similarly, the signal for each photosensor in the continuous charge read-out mode can decay exponentially with time to its equilibrium value.

In another embodiment for operating the charge-type change in trap occupancy monitor 740 to monitor trap emission or change in trap occupancy, binning and charge monitoring can be used. Binning or reading out multiple rows in a given column at substantially the same time, can reduce frame times and/or read-out times. It can be desirable to achieve faster frame times for charge monitoring of the change in trap occupancy of the photosensors, for example, when trying to reduce time to an initial image produced by the DR detector 300. Thus, it can be desirable to reduce time to detector initialization following power-up. Reduced time can be achieved by binning and charge monitoring because the frame readout time can be decreased by the number of binned rows. A 4× binning, for example, can yield exemplary frame times for a 3K×3K pixel DR detector during the power-up cycle of <50 ms. However, exemplary frame times can be higher or lower depending on a DR detector, size, configuration, ROICs and the like.

In yet another embodiment, combinations of current monitoring and charge monitoring can be used to monitor trap occupancy in photosensors of the DR detector 300. In such an embodiment, a change in trap occupancy monitor (e.g., charge integrator, 730) can be capable of both (i) current-type change in trap occupancy monitoring and (ii) charge-type change in trap occupancy monitoring and can be configured to switch between a current monitoring mode and a charge monitoring mode. The switch between the current monitoring mode and the charge monitoring mode can be once, more than once, can be selected based on factors such as but not limited to speed of measurement and/or accuracy of measurement.

In one embodiment, the data output from amplifiers for exemplary change in trap occupancy monitors can be converted to digitized pixel data (e.g., in a ROIC) that can be averaged in a FPGA or other processor in order to provide trap emission values or an average trap emission from the entire imaging array 780.

Figure 8:
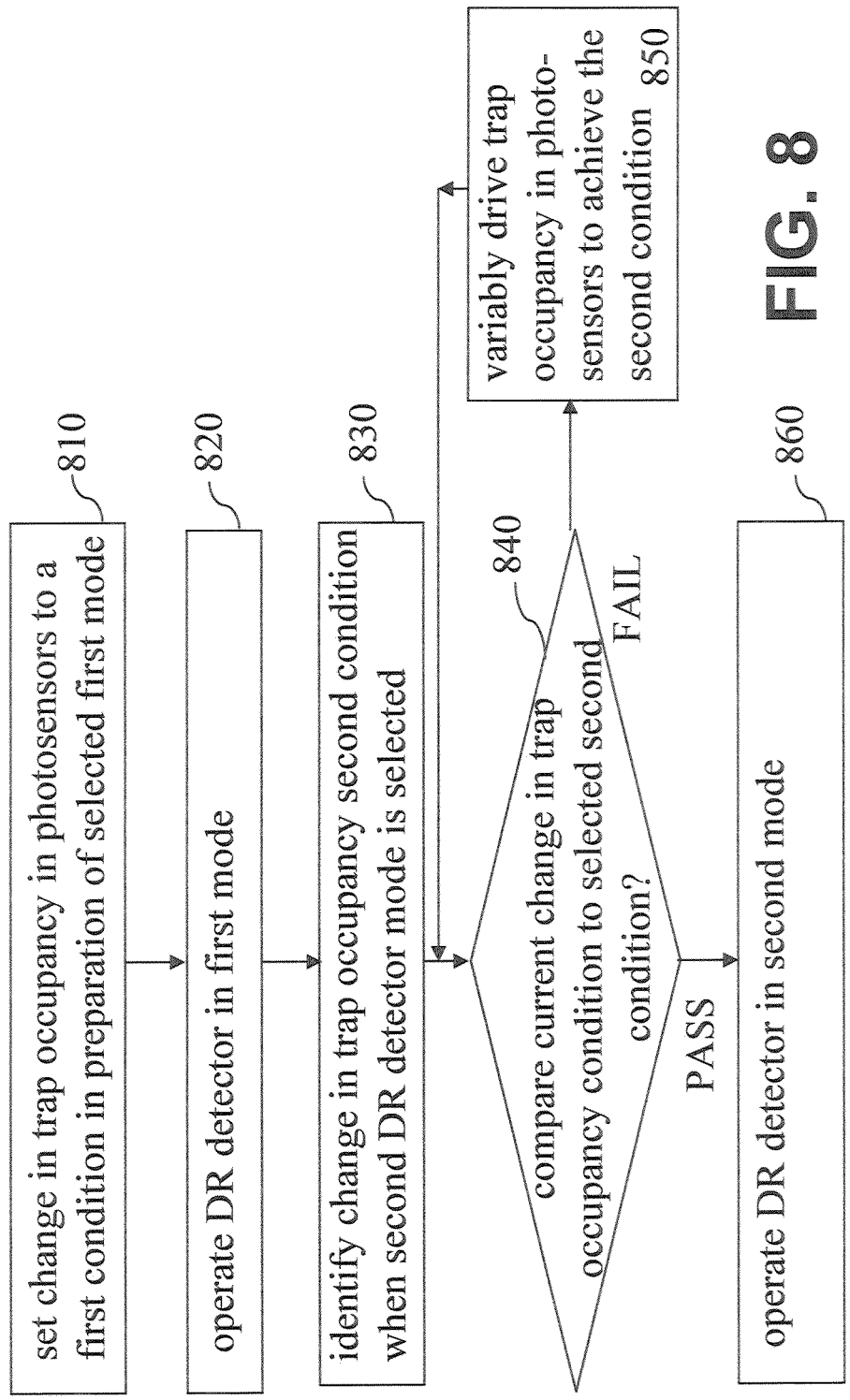
FIG. 8 is a flowchart that shows another embodiment of a method of operating a DR detector according to the application.

Referring to FIG. 8, a flow chart that shows an exemplary method of operating a DR detector in multiple modes according to embodiments of the application will now be described. As shown in FIG. 8, the method for operating a DR detector will be described using and can be implemented by embodiments of radiographic imaging apparatus shown in FIGS. 1-3B and 7A-7D; however, the method of FIG. 8 is not intended to be limited thereby.

As shown in FIG. 8, photosensors in an imaging array of a DR detector 300 can be set to a first level change in trap occupancy in preparation of a corresponding selected first operating mode of the DR detector 300 at operation block 810. Exemplary operating modes can include modes such as but not limited to power-up, power-down, standby, general radiation (gen rad), dual energy, tomosynthesis, fluoroscopy or NDT. Further, modes such as gen rad or tomosynthesis can include examination procedures incorporating a low/high dose settings or multiple exposures. In addition, a single exposure or multiple exposures can be preceded by or followed by one or more prep exposures (e.g., dark/light images). The photosensors can be actively monitored for a change in trap occupancy condition of the pixels (e.g., photosensors) at operation block 810. Then, the detector can be operated in the first mode at operation block 820. When the detector is set to be transitioned to a selected second mode including a different corresponding second change in trap occupancy level, the second change in trap occupancy level can be identified at operation block 830.

A current change in trap occupancy (e.g., monitored or detected) of the photosensors can be compared to the selected second change in trap occupancy level at operation block 840. When it is determined that the current change in trap occupancy condition of operation block 840 results in a PASS determination, control can continue to operation block 860, where the detector can be operated in the second mode. When it is determined that the current change in trap occupancy condition of operation block 840 results in a FAIL determination, control can continue to operation block 850, where the DR detector 300 can be variably operated to drive a change in trap occupancy in photosensors to reach the second change in trap occupancy level.

According to embodiments of the application, information on the charge level or change in charge level in the photosensors 770 can be used to change the operating mode of the DR detector 300 to achieve a desired state quickly or to maintain a desired charge state. For example, DR detectors can use electronic reset to reduce or minimize image lag and improve quantum efficiency. In electronic reset, the photosensors are briefly biased in forward bias or at a reverse bias closer to 0V than the nominal bias used for charge integration and readout. The desired or optimum change in trap occupancy achieved in electronic reset is significantly higher than the desired or optimum change in trap occupancy achieved when operating without electronic reset. In embodiments of the DR detector 300, once the trap emission signal and/or change in trap emission signal reach desired points/thresholds, the DR detector 300 can switch from a no-reset condition to an electronic reset condition to assist the achievement or maintenance of the monitored desired change in trap occupancy. Further, the reset voltage or reset time for the DR detector 300 can be adjusted once or continuously to maintain the desired monitored change in trap occupancy.

In one embodiment, the second change in trap occupancy level can represent a more stable operating condition (e.g., low dose gen rad) of the DR detector 300. To drive the current change in trap occupancy condition more rapidly to the second change in trap occupancy level, the change in trap occupancy can be used as a feedback variable whereby an estimated change in a operating criteria of the DR detector 300 that can modify a trap emission rate to jump closer to the second change in trap occupancy level can be determined from a plurality of current change in trap occupancy condition measurements, and then the resulting change in trap occupancy condition measurements after the feedback modification can be subsequently monitored, which can result in further dynamic feedback modifications based on change in trap occupancy condition measurements. For example, a clocking signal can be provided to the photosensors and a resulting change in trap occupancy can be monitored. Alternatively, a bias voltage can be increased to increase a rate of transient trap emission and a resulting change in trap occupancy can be monitored further.

Exemplary criteria to be modified can include bias voltage, reset value of a reset operation of the imaging array, frequency or duration of a reset operation, clocking signals or the like.

In one embodiment, the second operating mode at operation block 830 can be DR detector shut-down. When DR detectors are shut-down or turned off, completion of trap emission or emission to a zero bias voltage steady state condition can take minutes or tens of minutes or more than an hour. In such a situation, the DR detectors can be enabled for a subsequent radiographic imaging procedure before the photosensors trap emission is complete (e.g., zero bias voltage steady state), which can result in various negative imaging artifacts upon a first imaging procedure thereafter. Embodiments according to the application can drive trap occupancy or change in trap occupancy of photosensors of DR detectors to a prescribed finalization state responsive to a power-down instruction (e.g., from an operator or resulting from an operating condition) received by the DR detector.

In one embodiment, an exemplary finalization state for the DR detector 300 can result from a selection among prescribed sets of biasing pulses (e.g., at zero volts or a slightly forward biasing pulses), which can be provided across the photosensors according to current operating conditions or change in trap occupancy level of the DR detector 300 when the power-down instruction is received. In another embodiment, the finalization state can result from a dynamic calculation at the DR detector 300 to determine a plurality of reverse, zero or forward biasing pulses, which can be determined to drive the photosensors to a zero-bias state responsive to at least one previous examination procedures, the current operating conditions or change in trap occupancy level of the DR detector 300 when the power-down instruction is received. In yet another embodiment, the finalization state can result from actively monitoring a change in trap occupancy level of the photosensors until a prescribed condition (e.g., a known state close to zero bias) is reached after the power-down instruction is received. When actively monitoring the change in trap occupancy level to implement a finalization procedure to achieve the finalization state, feedback of the progress of the change in trap occupancy level relative to the finalization state can be used to modify criteria or dynamically change criteria that can control trap emission rates. Beneficially, imaging operations of the DR detector 300 can be repeatable or more accurate when subsequently enabled (e.g., power-up) when embodiments of finalization procedures according to the application are performed. In one embodiment, an additional different finalization state can be implemented for a stand-by operation mode of the DR detector 300.

Figure 9:
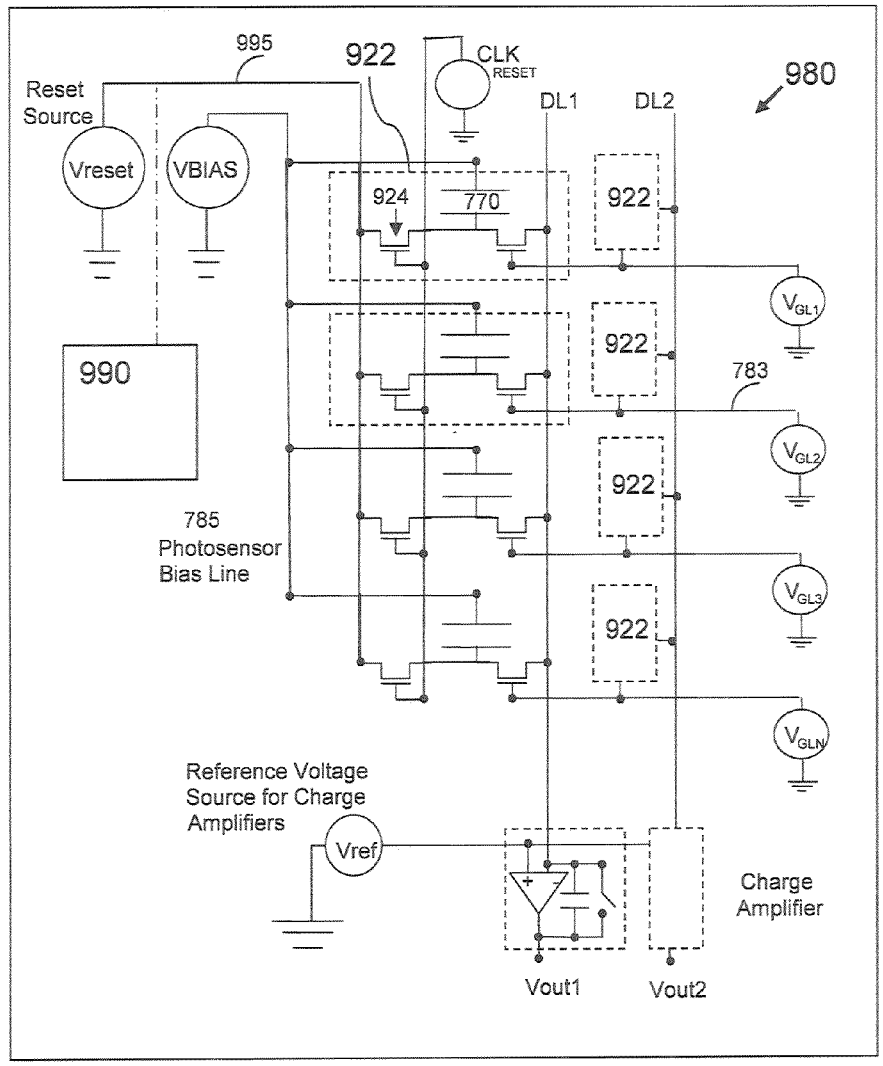
FIG. 9 is a diagram that shows schematic of a portion of an imaging array for a radiographic detector including exemplary photosensor trap monitor embodiments according to the application.

FIG. 9 is a diagram that illustrates another exemplary embodiment of a trap occupancy monitor in a DR detector of the type of FIG. 2B according to the application. The alternate embodiment shown in the schematic diagram of FIG. 9 can use a similar circuit arrangement to that of the FIG. 7A embodiment, with the addition of a separate reset switch 924, typically a TFT, as shown. The use of the reset switch 924 to set photosensor 770 to a reset level can help to reduce overall time required to reset the photosensor 770. In the FIG. 9 embodiment, reset periods can be enabled by turning on reset switch 924 for a sufficient time, using a reset clock signal $CLK_{RESET}$, to restore a reset voltage $V_{RESET}$ to the photosensor 770. Alternatively, the trap occupancy monitor 990 may be connected to the dataline. Implementations of trap occupancy monitor embodiments connected to conductors are illustrated in FIGS. 7A-D.

Figure 10:
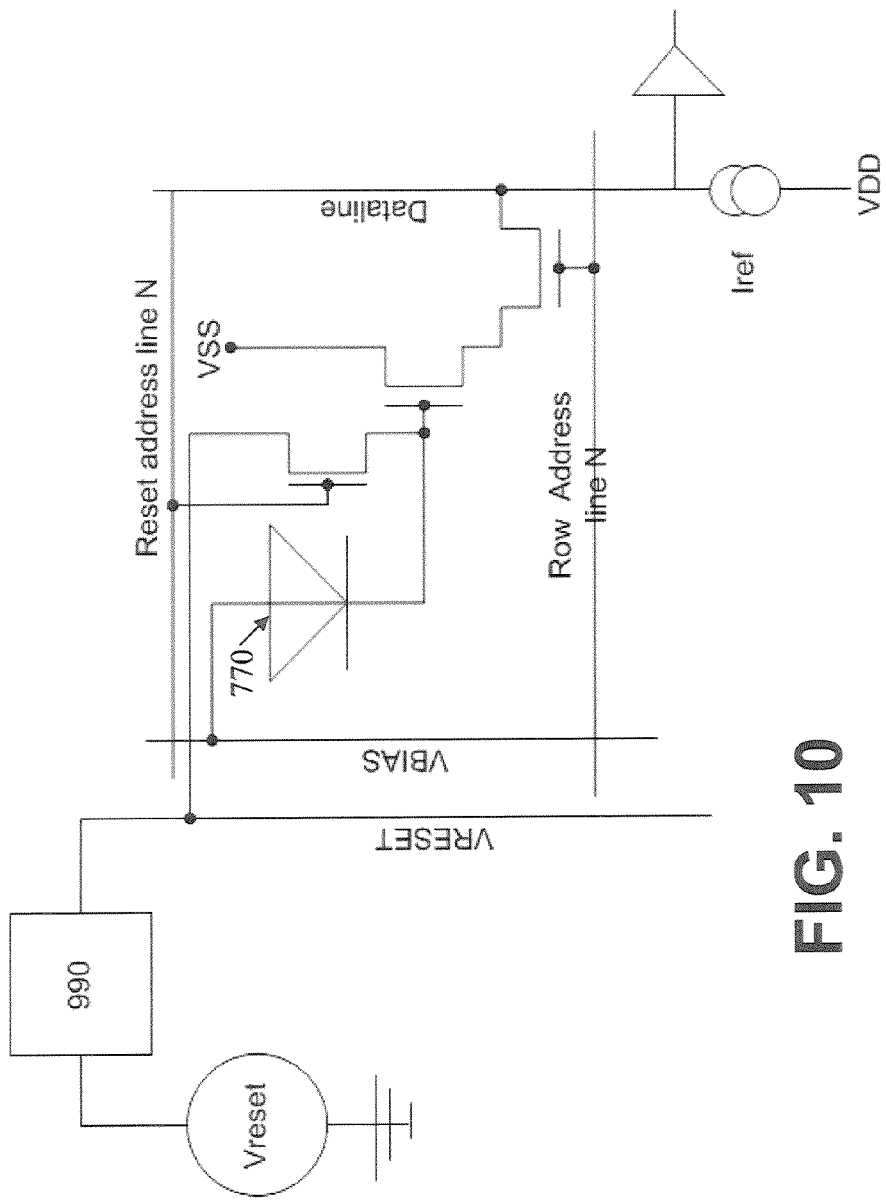
FIG. 10 is a diagram that illustrates another exemplary embodiment of a trap occupancy monitor in a DR detector according to the application.

FIG. 10 is a diagram that illustrates another exemplary embodiment of a trap occupancy monitor in a DR detector. As shown in FIG. 10, the DR detector can use a pixel type as shown in FIG. 2D. In the FIG. 10 embodiment, reset periods can be enabled by turning on reset switch for a sufficient time, using a reset clock signal $CLK_{RESET}$, to restore a reset voltage $V_{RESET}$ to the photosensor 770. When the change in trap occupancy has reached a pre-determined state, the reset gate may be switched to a non-conducting state and the panel placed in a ready state for exposure. Alternatively, the trap occupancy monitor 990 can be connected to the datalines or to charge amplifiers or voltage amplifiers attached to the datalines.

Embodiments of a trap occupancy monitor can be operatively coupled to photosensors 770 in imaging array 980 (e.g., using bias lines, data lines, reset lines or read out electronics) to provide a signal to a controller within or external to the DR detector 300 such as an image processor of a radiographic imaging apparatus. A pixel 922 can include photosensor 770, TFT 271, and a reset switch or TFT 924 (e.g., TFT 924 can have a control electrode coupled to the reset clock signal $CLK_{RESET}$, a first electrode coupled to reset voltage $V_{RESET}$, and a second electrode coupled to the photosensor 770). As shown in FIG. 9, an exemplary embodiment of a change in trap occupancy monitor 990 can actively monitor of change in trap occupancy of photosensors 770 by current monitoring, charge monitoring, using a reset line 995 coupled to reset switches 924 of one or more pixels 922.

Exemplary embodiments of information in or from change in trap occupancy monitor units/operations, DR detectors, radiographic imaging apparatus, and/or methods using the same can further be used for image processing of corresponding radiographic images or radiographic image data. For example, an examination procedure can include a first plurality (e.g., 3) of dark images, an exposure of a subject, and a second plurality of dark images (e.g., 3). In corresponding image processing, information from change in trap occupancy monitors from the first plurality of dark images can be used in image processing of the subject exposure including but not limited to information such as change in offset for photosensors used to estimate or modify photosensors offset at the subject exposure. Further, exemplary use of the information from embodiments of change in trap occupancy monitors can be used to track status (e.g., health, operational readiness or operational characteristics over time) of the detector over time and optionally, an operator can be alerted to recalibrate the detector or replace the detector.

Exemplary embodiments of a trap occupancy monitor according to the application have been described primarily as an active monitor of rate of change of trap occupancy of photosensors by current monitoring, charge monitoring, or the like. However, alternatively, embodiments of a trap occupancy monitor can be initiated at a known condition, and conditions (e.g., charge applied to a photosensor) can be determined over time to monitor trap occupancy conditions at the photosensors. For example, one exemplary method to monitor total trap occupancy (e.g., a parameter proportional) using current can be to integrate the current to obtain the total emitted charge and subtract the injected charge measured by the integration of current during the injection for photosensors starting from a prescribed condition.

Exemplary embodiments of a change in trap occupancy monitor according to the application can actively monitor of change in trap occupancy of photosensors by current monitoring, charge monitoring, using additional conductors passing through one or more pixels in an imaging array of a DR detector. Although passive-pixel architectures have been shown herein, active pixel architectures have been developed for amplification of charge at the pixel or allow read out of corresponding voltages from the active pixel (e.g., using datalines). Alternative imaging arrays according to the application can insert an amplifier in each pixel (e.g., between the TFT 271 and the data line 284) and embodiments of change in trap occupancy monitors according to the application can be coupled to conductors associated with the additional pixel structure of the active pixel architecture. Thus, embodiments of change in trap occupancy monitors according to the application can be coupled to elements of a passive pixel circuit (e.g., 1, 2, 3 transistors), an active pixel circuit (e.g., a 3, 4, 5 or more transistors), or photon counting pixel circuit.

Exemplary embodiments of trap occupancy monitor units/operations, finalization state units/operations, DR detectors, radiographic imaging apparatus, and/or methods using the same have various advantages. For example, embodiments described herein can include monitoring of trap emission charge or current to determine a readiness for image capture. For example, an image capture exposure can be enabled when a trap emission current level or a frame-to-frame trap emission charge level reaches a set-point indicating a stable operating position of photosensors, imaging arrays or DR detectors. Further, information on the charge level or change in charge level (e.g., trap occupancy) in photosensors of DR detectors can be used to change the operating mode of DR detectors to achieve a desired state quickly or to maintain a desired charge state.

The present application contemplates methods and program products on any computer readable media for accomplishing its operations. Exemplary embodiments according to the present application can be implemented using an existing computer processor, or by a special purpose computer processor incorporated for this or another purpose or by a hardwired system.

Also known in the art are digital radiographic imaging panels that utilize an array of pixels comprising an X-ray absorbing photoconductor, such as amorphous Selenium (a-Se), and a readout circuit. Since the X-rays are absorbed in the photoconductor, no separate scintillating screen is required.

It should be noted that while the present description and examples are primarily directed to radiographic medical imaging of a human or other subject, embodiments of apparatus and methods of the present application can also be applied to other radiographic imaging applications. This includes applications such as non-destructive testing (NDT), for which radiographic images may be obtained and provided with different processing treatments in order to accentuate different features of the imaged subject.

As will be appreciated by one skilled in the art, the present invention may be embodied as a system, method, or computer program product. Accordingly, an embodiment of the present invention may be in the form of an entirely hardware embodiment, an entirely software embodiment (including firmware, resident software, micro-code, and other suitable encodings) or an embodiment combining software and hardware aspects that may all generally be referred to herein as a "circuit" or "system." Furthermore, the present invention may take the form of a computer program product embodied in a computer-readable storage medium, with instructions executed by one or more computers or host processors. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as solid state hard drives, random access memory (RAM), or read only memory (ROM); or any other physical device or medium employed to store a computer program. The computer program for performing the method of the present invention may also be stored on computer readable storage medium that is connected to a host processor by way of the internet or other communication medium.

Those skilled in the art will readily recognize that the equivalent of such a computer program product may also be constructed in hardware. The computer-usable or computer-readable medium could even be paper or another suitable medium upon which executable instructions are printed, as the instructions can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport computer instructions for use by, or in connection with, an instruction execution system, apparatus, or device.

In accordance with one embodiment of the application a method of operating a panel digital radiographic detector to obtain a plurality of images, the detector including a plurality of photosensors arranged in rows and columns, the method can include operating the digital radiographic detector; determining a trap emission current level or a trap emission charge level of a subset of the photosensors; comparing the determined trap emission current level or the determined trap emission charge level to a first trap occupancy range; and controlling a trap occupancy of the subset of the photosensors by adjusting a clock signal or a bias voltage of the plurality of photosensors arranged in rows and columns or the charge integrators when the determined trap emission current level or the determined trap emission charge level is outside the first trap occupancy range.

In accordance with one embodiment of the application a method of operating a digital radiographic detector producing at least one image signal, the detector including a plurality of photosensors arranged in rows and columns, can include measuring transient trap occupancy of a subset of the photosensors of the detector; and modifying image processing of image data for the digital radiographic detector responsive to the measured change in trap occupancy of the subset of photosensors.

While the invention has been illustrated with respect to one or more implementations, alterations and/or modifications can be made to the illustrated examples without departing from the spirit and scope of the appended claims. In addition, while a particular feature of the invention can have been disclosed with respect to only one of several implementations, such feature can be combined with one or more other features of the other implementations as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A digital radiographic area detector comprising:
a plurality of pixels including electrically chargeable photosensors arranged over the area detector, where the plurality of pixels are configured to form an imaging array to capture radiographic images at the area detector;
a bias control circuit providing a bias voltage across the photosensors to charge each photosensor;
at least one sensor configured to provide a reading responsive to light delivered to each photosensor, the reading used for generating a captured radiographic image; and
a photosensor trap occupancy change monitor coupled to at least one photosensor of the plurality of pixels to measure an amount of change over a preselected time interval in trap occupancy of the at least one photosensor of the plurality of pixels whereby the measured amount of change is a difference between sequential measurements of trap occupancy over the preselected time interval, to determine whether the measured amount of change over the preselected time interval in trap occupancy satisfies a preselected threshold amount, and to transmit a control signal only if the preselected threshold amount is satisfied.

2. The digital radiographic detector of claim 1, wherein the photosensor trap occupancy monitor is configured to actively measure trap occupancy during at least one operating mode of the DR detector.

3. The digital radiographic detector of claim 1, wherein the photosensor trap occupancy monitor is electrically connected to the at least one photosensor of the plurality of pixels and is configured to measure a trap emission current level, rate of change of trap emission current level, a trap emission charge level, or rate of change of trap emission charge level of the at least one photosensor of the plurality of pixels.

4. The digital radiographic detector of claim 3, wherein the photosensor trap occupancy monitor is configured to use the trap emission current level or a trap emission charge level to determine a readiness of the detector for image capture.

5. The digital radiographic detector of claim 1, wherein the photosensor trap occupancy monitor is configured to repeatedly measure over the preselected time interval a trap emission current level to generate the control signal when the trap emission current level reaches a stable operating position set-point.

6. The digital radiographic detector of claim 1, wherein the measured change in trap occupancy over the preselected time interval is used for image processing of data from the plurality of pixels.

7. The digital radiographic detector of claim 1, wherein active monitoring by the photosensor trap occupancy monitor dynamically delays an image data capture after power is enabled at the detector or after an operational mode is selected until the measured change over the preselected time interval satisfies the preselected threshold amount.

8. The digital radiographic detector of claim 1, wherein the photosensor trap occupancy monitor is coupled to at least one charge integrator or the bias control circuit.

9. The digital radiographic detector of claim 8, wherein the photosensor trap occupancy monitor comprises a current monitoring circuit or a charge monitoring circuit connected to the at least one charge integrator or the current monitoring circuit connected to the bias control circuit.

10. The digital radiographic detector of claim 1, where the photosensor trap occupancy monitor is a charge monitoring circuit.

11. The digital radiographic detector of claim 1, wherein the photosensor trap occupancy monitor is configured to continuously measure a trap emission charge level or a trap emission current level to generate the control signal when the trap emission current level or the trap emission charge level reaches a stable operating position set-point.

12. A digital radiographic area detector comprising:
a plurality of pixels including electrically chargeable photosensors arranged over the area detector, where the plurality of pixels are configured to form an imaging array to capture radiographic images at the area detector;
a bias control circuit providing a bias voltage across the photosensors to charge each photosensor;
at least one sensor configured to provide a reading responsive to light delivered to each photosensor, the reading used for generating a captured radiographic image; and
a photosensor trap occupancy change monitor coupled to at least one photosensor of the plurality of pixels to measure an amount of change over a preselected time interval in trap occupancy of the at least one photosensor of the plurality of pixels, to determine whether the measured amount of change over the preselected time interval in trap occupancy satisfies a preselected threshold amount, and to transmit a control signal only if the preselected threshold amount is satisfied,
where the photosensor trap occupancy monitor is configured to repeatedly measure over the preselected time interval a trap emission charge level to generate the control signal when the trap emission charge level reaches a stable operating position set-point, wherein the stable operating position set-point is a difference between sequential measurements that satisfies a prescribed stability the threshold.

13. The digital radiographic detector of claim 12, wherein the sequential measurements are frame-to-frame measurements, and wherein a timing between the frame-to-frame measurements is reduced by concurrently reading out photosensors on multiple rows in at least one column or a 4-by-4 binning mode of the detector.

14. A digital radiographic area detector comprising:
a plurality of pixels including electrically chargeable photosensors arranged over the area detector, where the plurality of pixels are configured to form an imaging array to capture radiographic images at the area detector;
a bias control circuit providing a bias voltage across the photosensors to charge each photosensor;
at least one sensor configured to provide a reading responsive to light delivered to each photosensor, the reading used for a captured radiographic image;
a photosensor trap occupancy change monitor coupled to at least one photosensor of the plurality of pixels to measure change in trap occupancy of the at least one photosensor of the plurality of pixels;
a scintillator screen disposed on a side of the detector array for converting a radiographic image into a radiographic light image that is converted by the detector array into the electronic radiographic image;
a stiffener disposed in a cavity formed by a portion of a housing of the digital radiographic detector;
a shock absorbing assembly comprising an elastomeric material and located within the cavity for absorbing shock to the detector array/stiffener in directions perpendicular to and parallel to the detector array/stiffener;
a wireless interface having an antenna for wirelessly transmitting an electronic radiographic image from the detector to a remote location; and
a battery and imaging electronics mounted within the cavity below the detector array/stiffener.

15. A digital radiographic area detector comprising:
a plurality of pixels including electrically chargeable photosensors arranged over the area detector, where the plurality of pixels are configured to form an imaging array to capture radiographic images at the area detector;
a bias control circuit providing a bias voltage across the photosensors to charge each photo sensor;
at least one sensor configured to provide a reading responsive to light delivered to each photosensor; and
a photosensor trap occupancy change per unit time monitor coupled to at least one photosensor of the imaging array to measure an amount of change over a preselected time interval in trap occupancy per unit time of the at least one photosensor,
wherein the measured amount of change is a difference between sequential measurements of trap occupancy over the preselected time interval,
and wherein the photosensor trap occupancy change per unit time monitor outputs a control signal responsive to a prescribed condition being satisfied by the measured amount of change in trap occupancy over the preselected time interval.

16. The digital radiographic area detector of claim 15, wherein the monitor is configured to actively measure trap occupancy during at least one operating mode of the detector.

17. The digital radiographic area detector of claim 15, wherein the monitor is electrically connected to at least one of the photosensors and is configured to measure a trap emission current level, rate of change of the trap emission current level, a trap emission charge level, or rate of change of the trap emission charge level, of said at least one of the photosensors.

18. The digital radiographic area detector of claim 17, wherein the monitor is configured to use the trap emission current level or the trap emission charge level to determine a readiness of the detector for image capture.

19. The digital radiographic area detector of claim 15, wherein the monitor is configured to repeatedly measure over the preselected time interval a trap emission current level to generate the control signal when the trap emission current level reaches a stable operating position set-point.

20. The digital radiographic area detector of claim 15, wherein an active monitoring mode by the monitor dynamically delays an image data capture after power is enabled at the detector or after an operational mode is selected until the measured amount of change over the preselected time interval satisfies the prescribed condition.

* * * * *